(12) United States Patent
Lynch

(10) Patent No.: US 11,884,359 B2
(45) Date of Patent: Jan. 30, 2024

(54) BICYCLE SUSPENSION COMPONENTS

(71) Applicant: SRAM, LLC, Chicago, IL (US)

(72) Inventor: Timothy Lynch, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/680,574

(22) Filed: Feb. 25, 2022

(65) Prior Publication Data

US 2023/0271672 A1 Aug. 31, 2023

(51) Int. Cl.
*B62K 25/28* (2006.01)
*B62K 25/20* (2006.01)
*F16F 9/32* (2006.01)
*B62K 25/30* (2006.01)

(52) U.S. Cl.
CPC ............ *B62K 25/286* (2013.01); *B62K 25/20* (2013.01); *B62K 25/30* (2013.01); *F16F 9/3207* (2013.01)

(58) Field of Classification Search
CPC ...... B62K 25/286; B62K 25/20; B62K 25/30; F16F 9/3207
See application file for complete search history.

(56) References Cited

U.S. PATENT DOCUMENTS

| | | |
|---|---|---|
| 1,200,446 A | 10/1916 | Funk |
| 2,212,759 A | 8/1940 | Tea |
| 4,433,759 A | 2/1984 | Ichinose |
| 4,791,712 A | 12/1988 | Wells et al. |
| 5,195,766 A | 3/1993 | Dohrmann et al. |
| 5,367,918 A | 11/1994 | Chang |

(Continued)

FOREIGN PATENT DOCUMENTS

| | | |
|---|---|---|
| BE | 425983 A | 2/1938 |
| CH | 289869 A | 3/1953 |

(Continued)

OTHER PUBLICATIONS

Oredy Shocks Struts 2PCS Front Struts Coil Spring Suspension Struts Assembly, Web Page, https://www.metalpartmaker.com/index.php?route=product/product&product_id=24036, Last Checked Feb. 23, 2022.

(Continued)

*Primary Examiner* — Paul N Dickson
*Assistant Examiner* — Shams Dhanani

(57) ABSTRACT

Example bicycle suspension components are described herein. An example suspension component includes a spring and a damper configured in a telescoping arrangement. The shock absorber has a first end and a second end opposite the first end. The second end has an eyelet. The example suspension component also includes a shock end mount coupled to the first end of the shock absorber. The shock end mount includes a frame bracket. The frame bracket includes a first frame attachment portion to be coupled to a frame of the bicycle. The eyelet on the second end of the shock absorber defines a second frame attachment portion to be coupled to the frame of the bicycle. The shock end mount includes an elastomeric member to enable relative movement between the shock absorber and the first frame attachment portion. The elastomeric member is disposed outside of a region between the first frame attachment portion and the second frame attachment portion.

20 Claims, 15 Drawing Sheets

(56) References Cited

U.S. PATENT DOCUMENTS

| | | | |
|---|---|---|---|
| 5,628,388 A | 5/1997 | Angermann | |
| 5,649,693 A | 7/1997 | Busby et al. | |
| 6,217,049 B1 | 4/2001 | Becker | |
| 6,343,807 B1 | 2/2002 | Rathbun | |
| 6,505,719 B2 | 1/2003 | Gonzalez et al. | |
| 6,651,787 B2 | 11/2003 | Grundei | |
| 7,201,260 B2 | 4/2007 | Diederich et al. | |
| 7,451,860 B2 | 11/2008 | Nevoigt et al. | |
| 9,132,881 B2 | 9/2015 | Kwaterski | |
| 9,452,651 B2 | 9/2016 | Toyota | |
| 9,630,679 B2 | 4/2017 | Aoki | |
| 9,988,124 B2 | 6/2018 | Kwaterski | |
| 10,099,743 B2 | 10/2018 | Walthert et al. | |
| 10,166,832 B2* | 1/2019 | DeBruler | B60G 17/0155 |
| 10,703,158 B2 | 7/2020 | Pielock et al. | |
| 10,933,940 B2 | 3/2021 | Walthert et al. | |
| 2003/0051957 A1 | 3/2003 | Lemieux | |
| 2007/0119671 A1 | 5/2007 | Quinn et al. | |
| 2008/0041681 A1 | 2/2008 | Shipman | |
| 2010/0117322 A1 | 5/2010 | Achenbach | |
| 2013/0313803 A1 | 11/2013 | Kwaterski | |
| 2015/0091271 A1 | 4/2015 | Ikeda | |
| 2015/0344101 A1 | 12/2015 | Kwaterski | |
| 2016/0040741 A1 | 2/2016 | Laird et al. | |
| 2017/0167563 A1 | 6/2017 | Galasso et al. | |
| 2017/0334504 A1 | 11/2017 | Pye et al. | |
| 2018/0313423 A1* | 11/2018 | Laird | B62K 25/04 |
| 2018/0334219 A1 | 11/2018 | Walthert et al. | |
| 2019/0054973 A1 | 2/2019 | Barefoot | |
| 2019/0145483 A1 | 5/2019 | Laird et al. | |
| 2021/0010556 A1 | 1/2021 | Laird | |
| 2022/0252126 A1* | 8/2022 | Matsumoto | F16F 9/3271 |
| 2022/0364626 A1* | 11/2022 | Leclercq | F16F 9/3221 |
| 2023/0055754 A1* | 2/2023 | Kim | F16F 9/3207 |

FOREIGN PATENT DOCUMENTS

| | | |
|---|---|---|
| CN | 1784337 A | 6/2006 |
| CN | 104648585 A | 5/2015 |
| CN | 109572905 A | 4/2019 |
| CN | 209705168 U | 11/2019 |
| CN | 111043221 A | 4/2020 |
| DE | 1264165 B | 3/1968 |
| DE | 1292018 B | 4/1969 |
| DE | 1937147 A1 | 2/1971 |
| DE | 1780447 B1 | 3/1972 |
| DE | 2504202 A1 | 8/1975 |
| DE | 3301707 A1 | 7/1984 |
| DE | 3600845 A1 | 8/1986 |
| DE | 4032398 A1 | 4/1991 |
| DE | 4212079 A1 | 10/1993 |
| DE | 29920363 U1 | 2/2000 |
| DE | 20100117 U1 | 4/2001 |
| DE | 20219730 U1 | 3/2003 |
| DE | 10229287 A1 | 1/2004 |
| DE | 202004013640 U1 | 11/2004 |
| DE | 102012012902 A1 | 1/2013 |
| DE | 102013109342 A1 | 3/2015 |
| DE | 102015115678 A1 | 3/2017 |
| DE | 102015219168 A1 | 4/2017 |
| DE | 102017207523 B3 | 9/2018 |
| EP | 3403910 A1 | 11/2018 |
| EP | 3403910 B1 | 8/2020 |
| GB | 191029850 A | 10/1911 |
| GB | 104022 A | 2/1917 |
| GB | 116153 A | 6/1918 |
| GB | 155973 A | 1/1921 |
| GB | 408592 A | 4/1934 |
| GB | 693660 A | 7/1953 |
| GB | 752284 A | 7/1956 |
| GB | 899650 B | 6/1962 |
| JP | 526263 A | 1/1977 |
| JP | 5315967 A | 2/1978 |
| JP | 5753139 U | 3/1982 |
| JP | 604478 A | 1/1985 |
| JP | 6322781 A | 1/1988 |
| JP | 0335334 U | 4/1991 |
| JP | 069995 B2 | 2/1994 |
| JP | 069996 B2 | 2/1994 |
| JP | 0649507 Y2 | 12/1994 |
| JP | 0791475 A | 4/1995 |
| JP | 0774024 B2 | 8/1995 |
| JP | 08300928 A | 11/1996 |
| JP | 09119466 A | 5/1997 |
| JP | 2000009168 A | 1/2000 |
| JP | 2001241506 A | 9/2001 |
| JP | 2002130354 A | 5/2002 |
| JP | 2003014025 A | 1/2003 |
| JP | 2005180615 A | 7/2005 |
| JP | 2006090381 A | 4/2006 |
| JP | 2008045604 A | 2/2008 |
| JP | 2009108916 A | 5/2009 |
| JP | 2009264500 A | 11/2009 |
| JP | 2011163550 A | 8/2011 |
| JP | 2012092945 A | 5/2012 |
| JP | 2017180683 A | 10/2017 |
| TW | 200942443 | 10/2009 |
| TW | 201004834 | 2/2010 |
| TW | 201228873 | 7/2012 |
| TW | 201241336 A | 10/2012 |
| TW | 201520120 | 6/2015 |
| TW | I657956 B | 5/2019 |
| WO | 2006095032 A1 | 9/2006 |
| WO | 2012075236 A1 | 6/2012 |
| WO | 2014009019 A1 | 1/2014 |
| WO | 2015028510 A1 | 3/2015 |

OTHER PUBLICATIONS

King Shocks 2005+ Ford F-250/F-350 4WD Front 2.5 Dia Remote Reservoir Shock (Pair), Web Page, https://mbenzgram.com/products/king-shocks-2005-ford-f-250-f-350-4wd-front-2-5-dia-remote-reservoir-shock-pair?variant=37411716759707&currency=USD&utm_medium=product_sync&utm_source=google&utm_content=sag_organic&utm_campaign=sag_organic&gclid=EAlalQobChMlsMqa6MqW9gIV6BIMCh0Mtg_uEAQYBCABEgJFKvD_BWE, Last Checked Feb. 23, 2022.

Performance Series 2.0 Smooth Body IFP Shock, Web Page, https://www.ridefox.com/product.php?m=truck&t=shocks&partnumber=985-24-124&make=Toyota&model=Land+Cruiser&year=2021&position=Rear, Last Checked Feb. 23, 2022.

Coilover Spring Rates for Toyota Tacoma & 4 Runner; Website: https://accutuneoffroad.com/shock_selection/; Mar. 28, 2019, last checked Jul. 3, 2023.

Mike Kazimer, Review: RockShox' New Flight Attendant Suspension System; Website: https://www.pinkbike.com/news.review-rockshox-flight-attendant.html; Oct. 5, 2021, last checked Feb. 23, 2022.

Adam Steinke; First Look: A new revolutionary suspension system by Corratec?; Website: https://enduro-mtb.com/en/first-look-a-new-revolutionary-suspension-system-by-corratec/; Mar. 5, 2014, last checked Jul. 3, 2023.

* cited by examiner

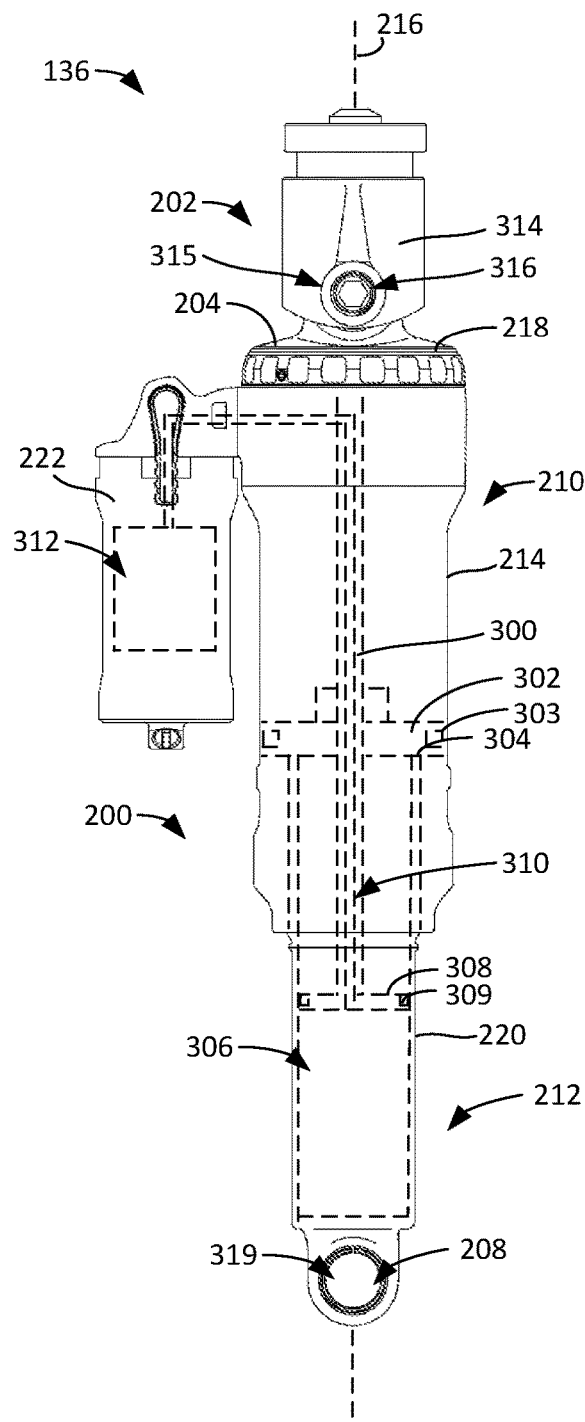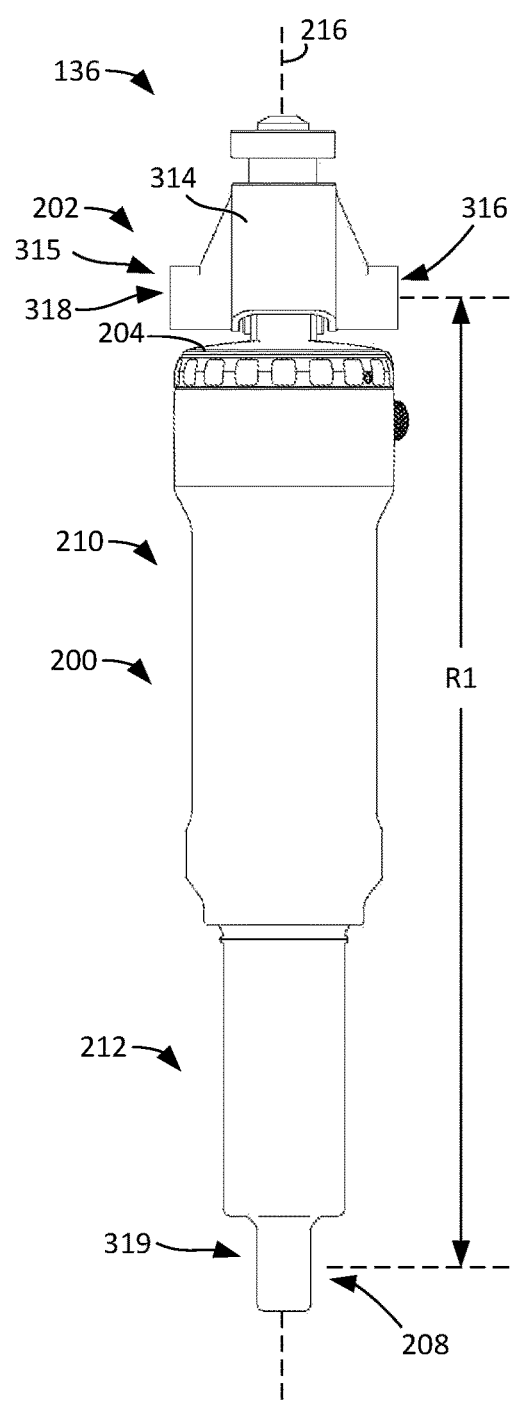
FIG. 3
FIG. 4

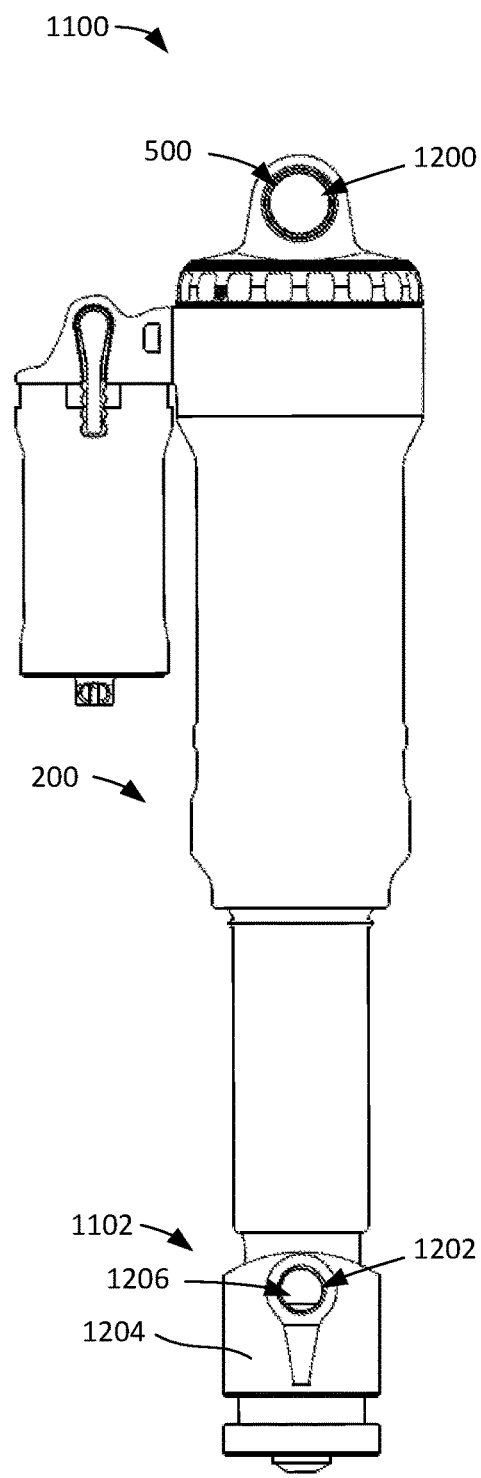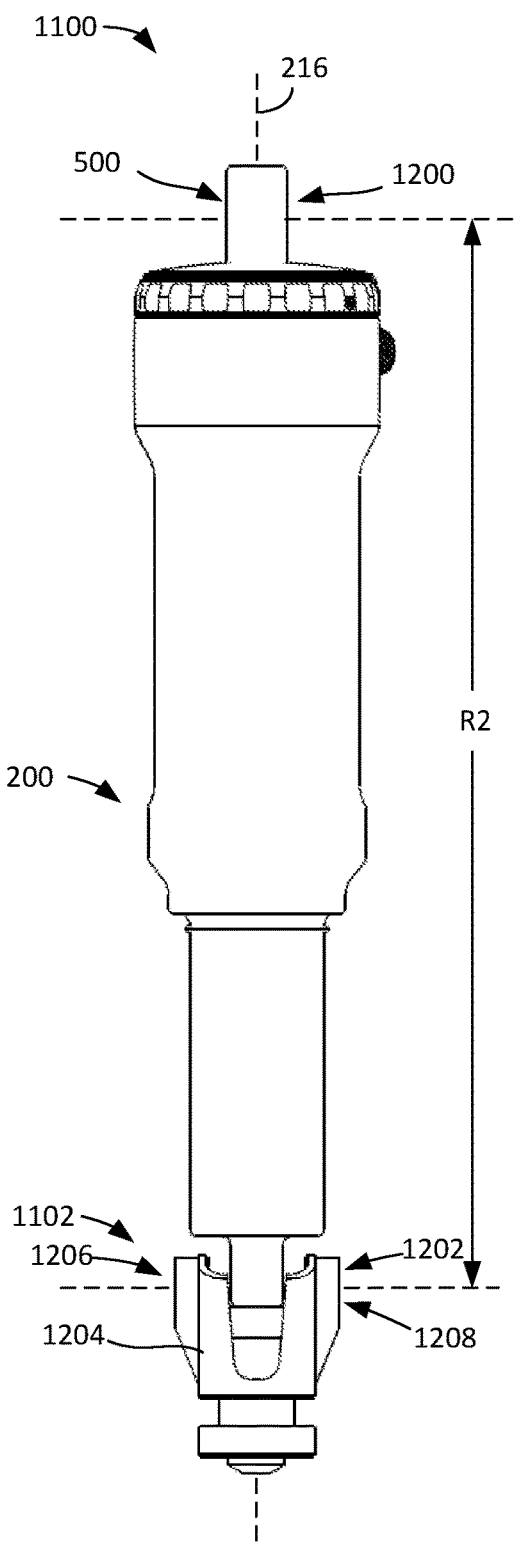
FIG. 12  FIG. 13

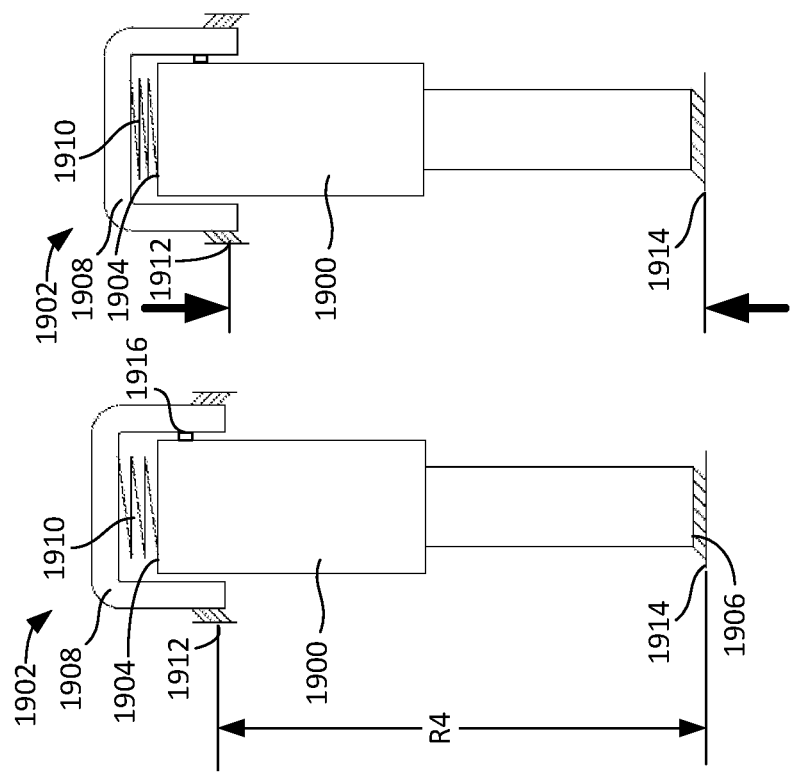

BICYCLE SUSPENSION COMPONENTS

FIELD OF THE DISCLOSURE

This disclosure relates generally to bicycle components and, more specifically, to bicycle suspension components.

BACKGROUND

Bicycles are known to have suspension components. Suspension components are used for various applications, such as cushioning impacts, vibrations, or other disturbances experienced by the bicycle during use as well as maintaining ground contact for traction. A common application for suspension components on bicycles is for cushioning impacts or vibrations experienced by the rider when the bicycle is ridden over bumps, ruts, rocks, pot holes, and/or other obstacles. These suspension components include rear and/or front wheel suspension components. Suspension components may also be used in other locations, such as a seat post or handlebar, to insulate the rider from impacts.

SUMMARY

An example suspension component for a bicycle disclosed herein includes a shock absorber including a spring and a damper configured in a telescoping arrangement. The shock absorber has a first end and a second end opposite the first end. The second end has an eyelet. The example suspension component also includes a shock end mount coupled to the first end of the shock absorber. The shock end mount includes a frame bracket. The frame bracket includes a first frame attachment portion to be coupled to a frame of the bicycle. The eyelet on the second end of the shock absorber defines a second frame attachment portion to be coupled to the frame of the bicycle. The shock end mount includes an elastomeric member to enable relative movement between the shock absorber and the first frame attachment portion. The elastomeric member is disposed outside of a region between the first frame attachment portion and the second frame attachment portion.

Another example suspension component for a bicycle disclosed herein includes a shock absorber including a spring and a damper configured in a telescoping arrangement. The shock absorber has a first end and a second end opposite the first end. The example suspension component includes a first shock end mount coupled to the first end of the shock absorber. The first shock end mount includes a first frame attachment portion to be coupled to a frame of the bicycle. The first shock end mount includes a first cushioning member to enable relative movement between the first end of the shock absorber and the first frame attachment portion. The example suspension component also includes a second shock end mount coupled to the second end of the shock absorber. The second shock end mount includes a second frame attachment portion to be coupled to the frame for the bicycle. The second shock end mount includes a second cushioning member to enable relative movement between the second end of the shock absorber and the second frame attachment portion. The first cushioning member and the second cushioning member are disposed outside of a region between the first frame attachment portion and the second frame attachment portion.

A shock end mount to couple a shock absorber to a frame of a bicycle is disclosed herein. The example shock end mount includes a frame bracket including a threaded opening to receive a threaded fastener to couple the frame bracket to the frame of the bicycle. The frame bracket has a wall with an opening. The example shock end mount includes a post bracket to be coupled to the shock absorber. The post bracket including a base, a post extending from the base, and a cap coupled to a distal end of the cap. The post extends through the wall of the frame bracket. The post and the opening in the wall have a rectangular cross-section to limit rotation between the frame bracket and the post bracket. The example shock end mount also includes a first elastomeric member disposed between the base and the wall, and a second elastomeric member disposed between the cap and the wall. The first and second elastomeric members enable relative movement between the frame bracket and the shock absorber.

BRIEF DESCRIPTION OF THE DRAWINGS

In FIG. 2, the example suspension component includes an example shock absorber and an example shock end mount coupled to a first end of the example shock absorber.

FIG. 3 is a side view of the example suspension component of FIG. 2.

FIG. 4 is a side view of the example suspension component of FIG. 2.

FIG. 12 is a side view of the example suspension component of FIG. 11.

FIG. 13 is a side view of the example suspension component of FIG. 11.

FIG. 17 is a side view of another example suspension component that can be implemented on the example bicycle of FIG. 1. In FIG. 11, the example suspension component includes the example shock absorber of FIG. 2 with example shock end mounts coupled to both ends of the example shock absorber.

FIGS. 19A-19D are schematics of an example shock absorber and an example shock end mount on a first end of the example shock absorber in different states.

The figures are not to scale. Instead, the thickness of the layers or regions may be enlarged in the drawings. In general, the same reference numbers will be used throughout the drawing(s) and accompanying written description to refer to the same or like parts.

Figure 1:
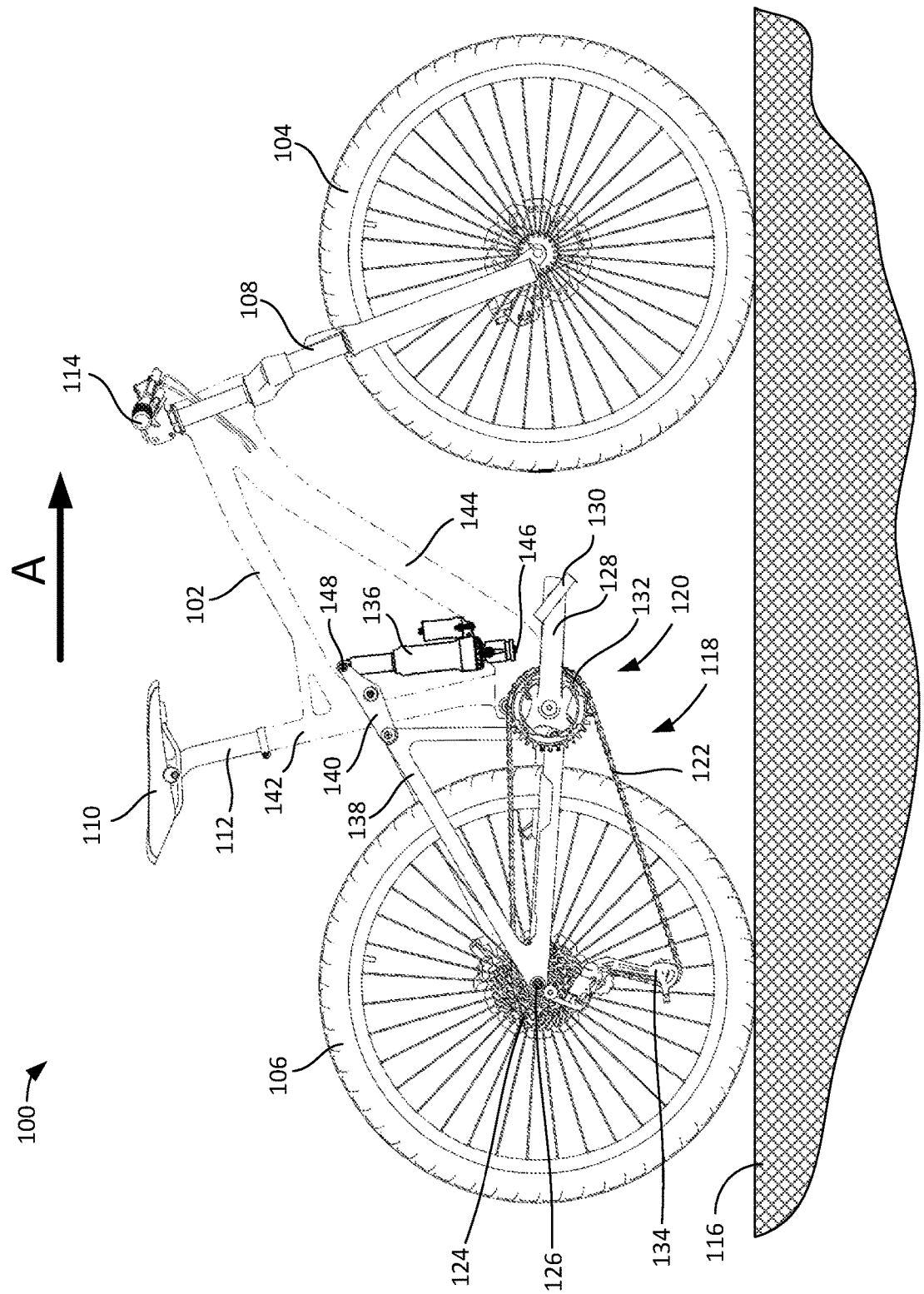
FIG. 1 is a side view of an example bicycle that may employ any of the example components disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example suspension components that can be implemented on a vehicle, such as a bicycle. An example suspension component disclosed herein includes a shock absorber. The shock absorber includes a spring and a damper configured in a telescoping arrangement. Known shock absorbers include frame attachment portions, such as eyelets, on opposite ends of the shock absorber. The shock absorber can be coupled between two sections of the frame of the bicycle via the eyelets. In particular, the bicycle has two shock attachment portions (sometimes referred to as mounting points) where the shock absorber can be coupled between. For example, the shock absorber may have a first eyelet (a first frame attachment portion) on a first end of the shock absorber that can be coupled to a rocker (a first shock attachment portion) that is moved by the rear wheel, and the shock absorber may have a second eyelet (a second frame attachment portion) on a second end of the shock absorber that can be coupled to another section of the frame (a second shock attachment portion), such as the down tube of the frame. Shock absorbers configured to be attached to a bicycle frame in a manner that primarily reacts to movement of a bicycle rear wheel are considered rear shock absorbers. Shock absorbers are typically sized to use the maximum space available between the shock attachment portions, so as to improve performance and reduce the possibility of top-out. The shock absorber compresses and expands (rebounds) to dampen and absorb vibrations and impacts of the rear wheel, which reduces these shocks and vibrations transmitted through the frame to the rider. Shock absorbers require a certain breakaway force before the two ends of the shock absorber begin to move relative to each other. In particular, the damper and spring may include pistons with seals that require a certain amount of force to overcome the static friction before the two ends of the shock absorber can move relative to each other. Further, every time the direction of movement changes (e.g., expansion to compression), this static friction needs to be overcome. As such, there is a slight delay while the force builds up before the two sections of the frame begin to move. Further, high frequency (e.g., frequencies above 5 hertz (Hz)), lower amplitude vibrations, such as those caused by a washboard terrain, are typically not absorbed by the shock absorber. Instead, these high frequency vibrations are transmitted through the frame and, thus, can be felt by the rider.

Disclosed herein are example shock end mounts and example suspension components including the example shock end mounts that address the above-noted drawbacks. An example shock end mount disclosed herein can be used to couple an end of a shock absorber to a shock attachment portion (sometimes referred to as a mounting point) on the bicycle. Therefore, the shock end mount forms an interface between the end of the shock absorber and the shock attachment portion on the bicycle. In some examples, the shock end mount is used to couple a first end of the shock absorber to a first shock attachment portion on the bicycle (e.g., a rocker), while the second (opposite) end of the shock absorber is coupled directly to the second shock attachment portion on the bicycle (e.g., the down tube). For example, the shock end mount includes or defines a first frame attachment portion. The frame attachment portion is the point, location, and/or structure where the shock end mount is coupled to the first shock attachment portion on the frame of the bicycle. The first frame attachment portion may be, for example, one or more threaded openings or bores that receive threaded fasteners (e.g., bolts). The second end of the shock absorber may include an eyelet that defines a second frame attachment portion that is coupled to the second shock attachment portion on the frame of the bicycle.

The example shock end mount is configured to improve shock absorption and absorb high frequency and/or low magnitude vibrations. In particular, the example shock end mount includes one or more cushioning members that enable relative movement between the frame attachment portion and the first end of the shock absorber. As such, the example shock end mount enables relative movement between the two sections of the frame without having to overcome the friction in the seals of the damper and spring components. In some examples, the cushioning members are implemented as elastomeric members (e.g., rubber pads). In other examples, the cushioning members can be implemented as springs (e.g., metallic coil springs) or other types of cushioning members. Therefore, when riding over a bump, for example, the two sections of the frame can move relative to each other before the breakaway force of the shock absorber is reached. As such, the shock end mount enables the two sections of the frame to more quickly absorb shocks and impulses. Lower frequency vibrations are partially absorbed by the shock end mount and transmitted through the shock end mount to the shock absorber. Further, the example shock end mount also absorbs high frequency vibrations, such as frequencies above 5 Hz, that would otherwise be transmitted to through the frame and felt by the rider. The example shock end mount enables the two sections of the frame to flutter, thereby reducing vibrations that are felt by the rider. Therefore, lower frequency vibrations are partially absorbed by the shock end mount until the breakaway force causes the shock absorber to compress or expand, while high frequency vibrations are absorbed by the shock end mount. As such, the example spring mounts disclosed herein provide additional compression force cushioning from rolling surface impacts and vibration. Further, the example shock end mounts disclosed herein also provide extension force cushioning from a shock rebound or the suspension vehicle rapidly leaving the ground with the weight of the unsprang inertia moving away from the sprung frame. As a result, the example shock end mounts disclosed herein reduce shocks, impacts, and vibrations felt by the rider, which creates a more comfortable ride for the rider. This also increases rider confidence in the traction and grip at the wheels.

In some examples disclosed herein, the cushioning member(s) is/are disposed outside of a region between the first frame attachment portion on the shock end mount and the second frame attachment portion on the second end of the shock absorber. As such, the example shock end mount and the cushioning member(s) do not interfere with or shorten the allowable size (e.g., length) of the shock absorber and/or stroke distance of the shock absorber. As such, the shock end mount enables the same size shock absorber (with the same potential stroke distance) as if the shock absorber was coupled directly between the two shock attachment portions on the bicycle. Therefore, the shock end mount does not require a modified or shortened shock absorber. Instead, the shock end mount can be used with common sized shock absorber.

An example shock end mount includes a frame bracket. The frame bracket defines a first frame attachment portion that is to be coupled to the frame. For example, the frame bracket can include one or more threaded openings to receive threaded fasteners (e.g., bolts) to couple the frame bracket to the first shock attachment portion on the frame of the bicycle. The example frame bracket also includes a post bracket that is coupled to the first end of the shock absorber. For example, the post bracket can be coupled to an eyelet on the first end of the shock absorber. The post bracket includes a base and a post extending from the base. The post extends through a load translating member, such as a wall of the frame bracket. A cap is coupled to a distal end of the post, such that the base and the cap are disposed on opposite sides of the wall of the frame bracket. The shock end mount includes a first elastomeric member between the base of the post bracket and the wall of the frame bracket, and a second elastomeric member between the cap of the post bracket and the wall of the frame bracket. The first and second elastomeric members compress and expand to enable the frame bracket and the shock absorber to move relative to each other. This enables the first end of the shock absorber and the first frame attachment portion to move relative to each other before overcoming the friction in the shock absorber seals. For example, when a compressive force is applied to the suspension component (e.g., the two sections of the frame are moved toward each other), a first one of the elastomeric members is compressed (e.g., loaded in compression), which enables the first frame attachment portion to move relative to the first end of the shock absorber. Additionally, a second one of the elastomeric members may be expanded or loaded in tension. Because the elastomeric members are disposed on opposite sides of the plate, the initiating force to move the frame bracket is zero. Lower frequency vibrations are transmitted through the shock end mount to the shock absorber until the breakaway force is reached and the shock absorber compress. When the compressive force is removed, the elastomeric member expands to bias the frame bracket (and, thus, the first frame attachment portion) to the original position relative to the post bracket. The opposite reaction occurs during rebound. In other words, the second elastomeric member may be compressed, and the first elastomeric member may be expanded or loaded in tension. Therefore, the shock end mount acts as a spring in series with the shock absorber, thereby enabling relative movement between the two sections of the frame of the bicycle portions independent of the shock absorber telescoping movement. The elastomeric members also absorb high frequency vibrations that would otherwise not be absorbed by the shock absorber.

In some examples, a second shock end mount can be coupled to the second end of the shock absorber and used to couple the second end of the shock absorber to the second shock attachment portion on the bicycle. Therefore, shock end mounts can be used on both ends of the shock absorber. The second spring frame mount functions in a similar manner to enable relative movement between the second end of the shock absorber and the second frame attachment portion and, thus, enable relative movement between the two sections of the frame independent of the shock absorber telescoping movement.

Turning now to the figures, FIG. 1 illustrates one example of a human powered vehicle on which the example suspension components disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 coupled to the frame 102 (e.g., near the rear end of the frame 102 relative to the forward direction A) via a seat post 112. The bicycle 100 also includes handlebars 114 coupled to the frame 102 and the front fork 108 (e.g., near a forward end of the frame 102 relative to the forward direction A) for steering the bicycle 100. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. A rear gear change device 134, such as a derailleur, is disposed at the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 includes a suspension system having one or more suspension components. In the illustrated example, the bicycle 100 includes a rear suspension component 136, referred to herein as the suspension component 136. In this example, the suspension component 136 is implemented as or includes a shock absorber, which includes a telescoping spring and damper. The suspension component 136 is coupled between two shock attachment portions (also referred to as mounting points) on the frame 102 of the bicycle 100. For instance, in this example, the frame 102 of the bicycle 100 includes a rear triangle 138 (which can actually be two triangles, one on each side of the rear wheel 106) and a rocker 140. A lower end of the rear triangle 138 is pivotally coupled by a link to the frame 102 at or near an intersection of a seat tube 142 and a down tube 144 of the frame 102. In the illustrated example, the rocker 140 is pivotally coupled to the seat tube 142 of the frame 102. An upper end of the rear triangle(s) 138 is/are pivotally coupled to one end of the rocker 140. One end of the suspension component 136 is coupled (e.g., via one or more threaded fasteners) to a first shock attachment portion 146 on the down tube 144. The other end of the suspension component 136 is coupled to a second shock attachment portion 148 on the other end of the rocker 140. The first and second shock attachment portions 146, 148 may be openings or threaded holes used to insert one or more bolts for coupling the suspension component 136 to the frame 102. If the rear wheel 106 is moved upward (such as when riding over a bump), the rocker 140 is rotated in the clockwise direction (in FIG. 1), which compresses the suspension component 136. When the force is removed, the suspension component 136 expands (rebounds), thereby moving the rear wheel 106 back downward to maintain traction with the surface 116. Thus, the suspension component 136 is coupled between two sections of the frame 102 that are moveable relative to each other.

In some examples, the front fork 108 is also implemented as a front suspension component. For example, a spring can be integrated into one of the legs and a damper can be integrated into the other leg. Therefore, the front fork 108 and the suspension component 136 absorb shocks and vibrations while riding the bicycle 100 (e.g., when riding over rough terrain). In other examples, the front fork 108 and/or the suspension component 136 may be integrated into the bicycle 100 in other configurations or arrangements. Further, in other examples, the suspension system may employ only one suspension component (e.g., only the suspension component 136) or more than two suspension components (e.g., an additional suspension component on the seat post 112) in addition to or as an alternative to the front fork 108 and the suspension component 136.

While the example bicycle 100 depicted in FIG. 1 is a type of mountain bicycle, the example suspension components disclosed herein can be implemented on other types of bicycles. For example, the disclosed suspension components may be used on road bicycles, as well as bicycles with mechanical (e.g., cable, hydraulic, pneumatic, etc.) and non-mechanical (e.g., wired, wireless) drive systems. The disclosed suspension components may also be implemented on other types of two-wheeled, three-wheeled, and four-wheeled human powered vehicles. Further, the example suspension components can be used on other types of vehicles, such as motorized vehicles (e.g., a motorcycle, a car, a truck, etc.).

Figure 2:
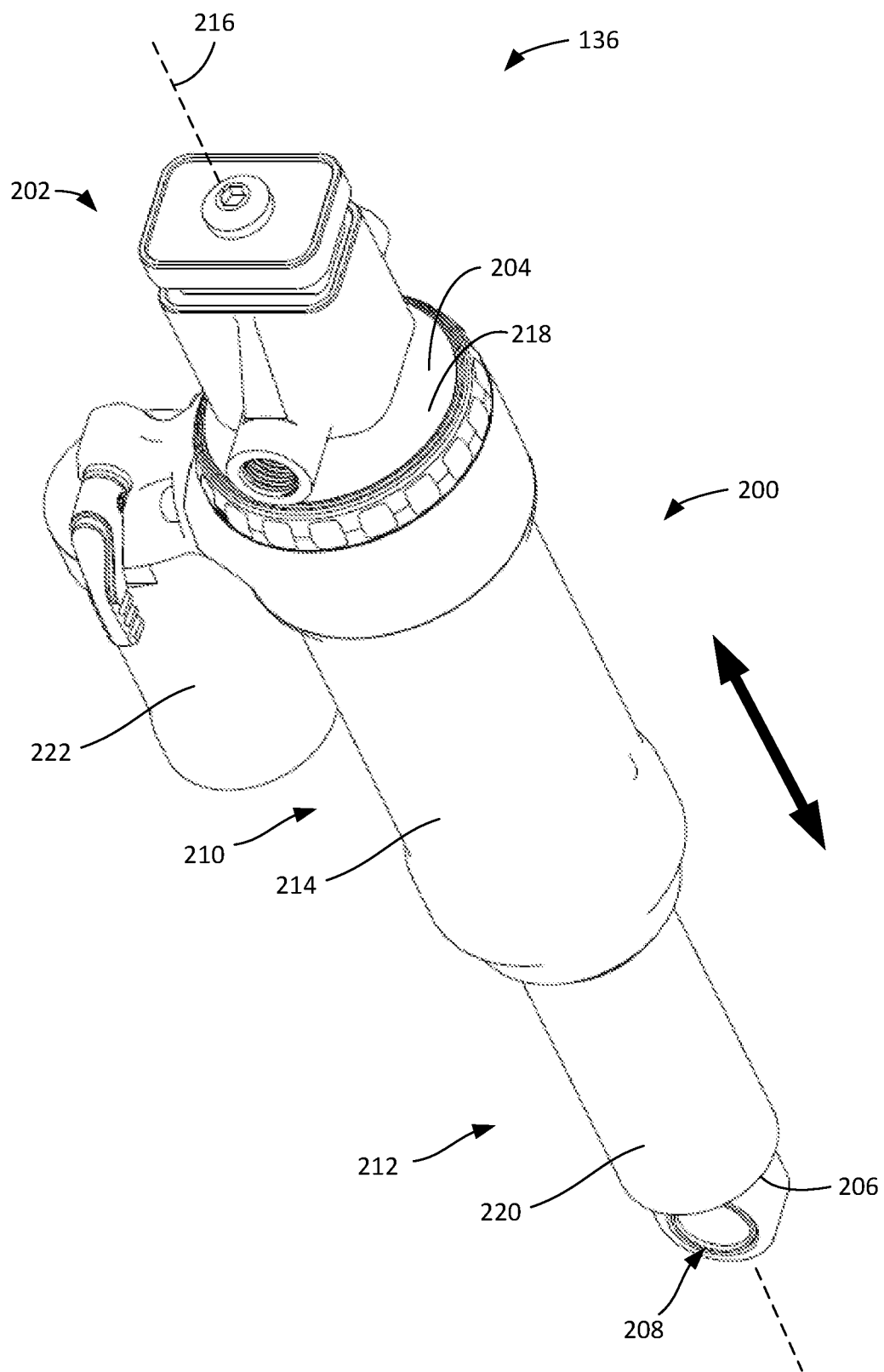
FIG. 2 is perspective view of an example suspension component that can be implemented on the example bicycle of FIG. 1.

FIG. 2 is a perspective view of the example suspension component 136, which is used as the rear suspension component on the bicycle 100. The example suspension component 136 can also be used on other locations on the bicycle 100. The example suspension component 136 can also be referred to as a shock assembly. In the illustrated example, the suspension component 136 includes an example shock absorber 200 and an example shock end mount 202. The shock absorber 200 has a first end 204 and a second end 206 opposite the first end 204. In some instances, the first end 204 is considered the top or upper end and the second end 206 is considered the bottom or lower end 204. However, the shock absorber 200 can be disposed in any orientation on a bicycle. For instance, in FIG. 1, the shock absorber 200 is oriented with the first end 204 facing downward and the second end 206 facing upward. In this example, the shock absorber 200 has eyelets on the first and second ends 204, 206. For instance, the first end 204 has a first eyelet (the first eyelet 500 shown in FIG. 5), and the second end 206 has a second eyelet 208. In this example, the shock end mount 202 is coupled to the first end 204 (e.g., to the first eyelet 500) of the shock absorber 200. The shock end mount 202 forms an interface between the first end 204 of the shock absorber 200 and the first shock attachment portion 146 (FIG. 1) on the frame 102 of the bicycle 100, as disclosed in further detail herein. Additionally or alternatively, another shock end mount can be coupled to the second end 206 of the shock absorber 200, examples of which are disclosed in further detail herein in connection with FIGS. 11-17.

In the illustrated example, the shock absorber 200 includes a spring 210 and a damper 212 (sometimes referred to as an integrated spring and damper). The spring 210 operates (by compressing or expanding) to absorb vibrations or shocks, while the damper 212 operates to dampen (slow) the movement of the spring 210. In the illustrated example, the spring 210 is implemented as an air can 214. However, in other examples, the spring 210 can be implemented as another type of spring, such as a coil spring. The spring 210 and the damper 212 are configured in a telescoping arrangement and aligned along a longitudinal axis 216 of the shock absorber 200. The longitudinal axis 216 also corresponds to the axis of movement of the shock absorber 200.

In the illustrated example, the shock absorber 200 includes a cap 218 that forms a top of the air can 214. The cap 218 also forms the first end 204 of the shock absorber 200. The first eyelet 500 (FIG. 5) is coupled to the cap 218 (or formed integral with the cap 218) and extends upward from the cap 218. The damper 212 includes a damper body 220. The distal end of the damper body 220 forms the second end 206 of the shock absorber 200. The second eyelet 208 is coupled to the damper body 220 (or formed integral with the damper body 220) and extends downward from the damper body 220. In some examples, the first end 204 is referred to as the spring end of the shock absorber 200, and the second end 206 is referred to as the damper end of the shock absorber 200. The air can 214 (which may be referred to as a first tube) and the damper body 220 (which may be referred to as a second tube) are configured in a telescopic arrangement. The damper body 220 is moveable into and out of the air can 214 as shown by the double-sided arrow. For example, during compression, the first and second ends 204, 206 are pushed toward each other, which moves the damper body 220 into the air can 214 (or moves the air can 214 over the damper body 220). Conversely, during rebound, the first and second ends 204, 206 are pushed (or and/or pulled) apart at least in part by force from the spring 210, which moves the damper body 220 out of the air can 214. In general, compression of the shock absorber 200 is followed by rebound.

In the illustrated example, the shock absorber 200 includes an external reservoir 222 (sometimes referred to as a shock can or shock piggy-back can). The external reservoir 222 is disposed outside of the spring 210 and the damper 212. The external reservoir 222 is used to house excess damper fluid as the shock absorber 200 compresses and/or rebounds. In particular, during compression and rebound, damper fluid is routed between the damper body 220 and the external reservoir 222. This type of shock absorber having an external reservoir has many advantages, such as for keeping nitrogen (or other pneumatic fluid) away from the main body of the shock absorber 200, splitting the load of a shock between two compression circuits, and enabling the use of larger internal floating pistons. However, in other examples, the shock absorber 200 may not include an external reservoir. Instead, the reservoir may be defined in the damper body 220 or another area in the tubed structured.

FIGS. 3 and 4 are side views of the suspension component 136 (rotated about 90° from each other). Before disclosing further details of the shock end mount 202, some of the internal components of the shock absorber 200 are disclosed in connection with FIG. 3. FIG. 3 shows some of the internal components of the shock absorber 200 in dashed lines. In the illustrated example, the damper 212 includes a shaft 300 that is coupled to and extends from the cap 218. A fixed piston 302 is coupled (e.g., via threaded engagement) to a top end 304 of the damper body 220. In the illustrated example, the damper body 220 defines a first chamber 306. The shaft 300 extends through the fixed piston 302 and into the first chamber 306. The shaft 300 slides into and out of the damper body 220 through the fixed piston 302 as the shock absorber 200 compresses and rebounds. In some examples, one or more seals are disposed between the shaft 300 and the fixed piston 302. The fixed piston 302 is slidable within the air can 214. During compression (when the air can 214 and the damper body 220 move toward each other), the fixed piston 302 is pushed into the air can 214, which compresses a gas (e.g., air) within the air can 214. After the compressive force is removed, the compressed gas in the air can 214 acts against the fixed piston 302 and pushes the fixed piston 302 (and, thus, the damper body 220) outward from the air can 214. In some examples, a seal 303 is disposed around the fixed piston 302 to prevent the gas in the air can 214 from leaking past the fixed piston 302. In other examples, the air can 214 can be filled with other types of fluids (e.g., oil). In other examples, the spring 210 can be implemented by a physical spring, such as a coil spring. For example, a coil spring can be disposed in the shaft 300 between the top end 304 of the damper body 220 and the cap 218. In other examples, the spring 210 can be implemented by other types of air spring and/or physical spring configurations.

The first chamber 306 in the damper body 220 is filled with fluid. The fluid may be, for example, oil, such as a mineral oil based damping fluid. In other examples, other types of damping fluids may be used (e.g., silicon or glycol type fluids). A piston 308 is coupled to a distal end of the shaft 300 and disposed in the first chamber 306. In some examples, a seal 309 is disposed around the piston 308 to prevent fluid from leaking between the piston 308 and the damper body 220. A fluid flow path 310 is defined between the first chamber 306 in the damper body 220 and a second chamber 312 defined in the external reservoir 222. In this example, the fluid flow path 310 is formed at least in part through the piston 308 and the shaft 300. The piston 308 slides in the first chamber 306 of the damper body 220 as the shock absorber 200 compresses and extends. For example, when the shock absorber 200 compresses, the piston 308 is moved toward a bottom end of the damper body 220 and into the first chamber 306, which decreases the volume in the first chamber 306 and, thus, increases the pressure of the fluid in the first chamber 306. As a result, the fluid in the first chamber 306 is pushed up through the fluid flow path 310 and into the second chamber 312 in the external reservoir 222. Conversely, during rebound, the piston 308 is moved in the opposite direction, i.e., away from the bottom end of the damper body 220 and toward the top end 304 of the damper body 220. The rebound movement is driven at least in part by the spring 210. For example, after the compressive force is removed, the air can 214 causes the damper body 220 to move away from the cap 218, which causes the piston 308 to slide (upward) in the first chamber 306, thereby expanding the shock absorber 200. This movement causes a decrease in pressure of the fluid in the first chamber 306, which draws the fluid from the second chamber 312 back through the fluid flow path 310 and into the first chamber 306. This movement or flow of fluid between the first and second chambers 306, 312 causes the damping effect.

As disclosed above, the shock absorber 200 includes multiple seals (e.g., the seals 303, 309, etc.) and sliding surfaces. These seals and surfaces have a static friction that must be overcome to compress or expand the shock absorber 200. While relatively small, this static friction may cause a delay in the compression or rebound movements. For example, if a compressive force is applied to the shock absorber 200, the air can 214 and the damper body 220 may remain in the same relationship (i.e., no movement) until the force builds enough to overcome the static friction. Once the static friction is overcome, the components of the shock absorber 200 move (e.g., slide), which enables the air can 214 and the damper body 220 to move relative to each other and, thus, enables the two ends to move relative to each other. This delay may cause an undesirable stick slip feeling that can be felt by the rider. Additionally, high frequency vibrations (e.g., above 5 Hz) having a low amplitude may be not absorbed by the shock absorber 200. Instead, these high frequency vibrations are transmitted through the frame 102 (FIG. 1) and are felt by the rider.

To address the above-noted drawbacks, the suspension component 136 includes the shock end mount 202. Referring to FIGS. 3 and 4, in this example, the shock end mount 202 is coupled to the first end 204 of the shock absorber 200. The shock end mount 202 includes or defines a first frame attachment portion 315 that forms the location where the shock end mount 202 (and, thus, the suspension component 136) is to be coupled to the corresponding first shock attachment portion 146 (FIG. 1) on the frame 102 of the bicycle 100. For example, in the illustrated example, the shock end mount 202 includes an example frame bracket 314. In this example, the frame bracket 314 includes a first threaded opening 316 and a second threaded opening 318 (FIG. 4). The first and second threaded openings 316, 318 form or define the first frame attachment portion 315. The first and second threaded openings 316, 318 are configured to receive threaded fasteners (e.g., bolts). For example, the frame bracket 314 can be coupled to the frame 102 by inserting threaded fasteners through the frame 102 (e.g., at the first shock attachment portion 146 on the down tube 144) and into the first and second threaded openings 316, 318. While in this example the frame bracket 314 includes two threaded openings, in other examples, the frame bracket 314 may only include one threaded opening and may be coupled to the frame 102 via one threaded fastener. Therefore, in this example, the frame bracket 314 includes the first frame attachment portion 315 to be coupled to the frame 102 (FIG. 1) of the bicycle 100 (FIG. 1). In other examples, the first frame attachment portion 315 can be formed by another type of structure on the frame bracket 314. For example, the first frame attachment portion 315 may be formed by pegs with grooves for lockrings or other bearing mounted options for pinning to the frame. In another example, the frame bracket 314 could be permanently or fixedly coupled (e.g., welded) to the frame 102, with detachable mechanisms for attaching/installing the shock absorber 202. In the illustrated example, the second eyelet 208 forms a second frame attachment portion 319 for coupling the shock absorber 200 to the second shock attachment portion 148 (FIG. 1) on the frame 102 (FIG. 1). As the first and second shock attachment portions 146, 148 (FIG. 1) on the frame 102 (FIG. 1) move toward or away from each other, the first and second frame attachment portions 315, 319 move toward or away from each other to compress or extend the shock absorber 200 and/or the shock end mount 202.

As shown in FIGS. 3 and 4, the shock end mount 202 is aligned with the spring 210 and the damper 212 along the longitudinal axis 216. The shock end mount 202 enables relative movement between the shock absorber 200 and the first attachment frame portion 315 and, thus, between the shock absorber 200 and the first shock attachment portion 146 on the frame 102 (FIG. 1). Therefore, the shock end mount 202 acts as a spring in series with the shock absorber 200. As disclosed in further detail herein, the shock end mount 202 includes one or more cushioning members, such as elastomeric members (e.g., rubber pads). The cushioning member(s) are disposed between the first end 204 (e.g., the first eyelet) and the frame bracket 314. The cushioning member(s) enable(s) relative movement between the first end 204 of the shock absorber 200 and the frame bracket 314 and, thus, between the shock absorber 200 and the frame 102. As such, the shock end mount 202 enables the two sections of the frame 102 (e.g., the first and second shock attachment portions 146, 148) to move relative to each other before the breakaway force for the shock absorber 200 is reached, thereby enabling the suspension component 136 to absorb the vibrations more quickly during compression. The shock end mount 202 also absorbs high frequency, low amplitude vibrations that would otherwise be transmitted through the frame 102 to the rider. Therefore, the shock end mount 202 is frequency sensitive. In particular, long and slow inputs are partially absorbed by the shock end mount 202 and transmitted to the shock absorber 200, whereas fast and short inputs are absorbed just in the shock end mount 202. As a result, the shock end mount 202 reduces vibrations felt by the rider (e.g., at the handlebars 114 and/or the seat 110).

Also, as disclosed in further detail herein, the cushioning member(s) is/are disposed outside of a region R1 (labeled in FIG. 4) between the first frame attachment portion 315 (corresponding to the first and second threaded openings 316, 318) and the second frame attachment portion 319 (corresponding to the second eyelet 208). For example, referring to FIG. 4, the cushioning member(s) is/are above the first frame attachment portion 315. As such, the shock end mount 202 does not interfere with or shorten the size (e.g., length) or stroke distance of the shock absorber 200. Therefore, the shock end mount 202 can be used with a traditional sized shock absorber that is sized to fit between the first and second shock attachment portions 146, 148 (FIG. 1).

Figure 5:
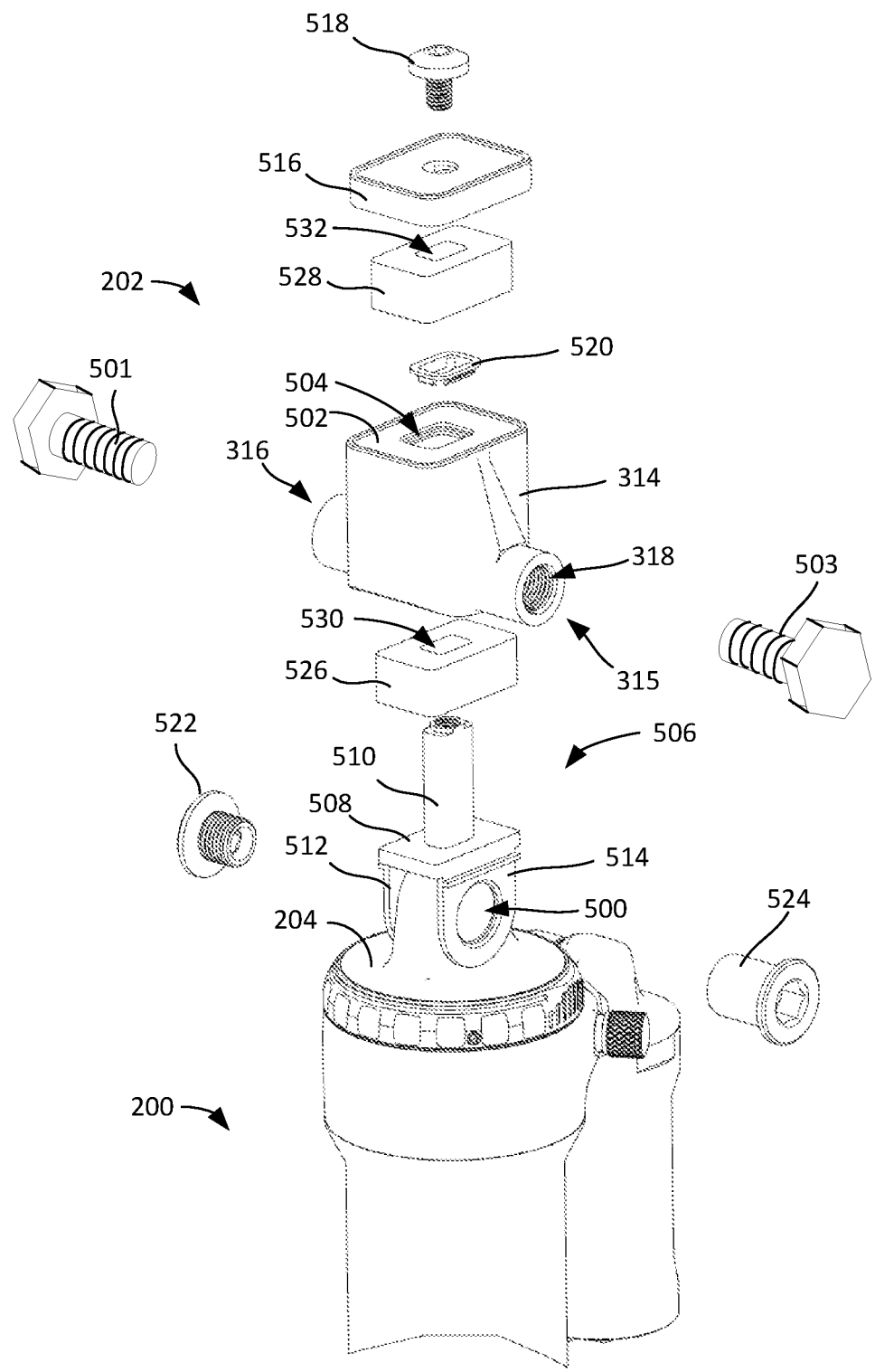
FIG. 5 is an exploded view of the example shock end mount of FIG. 2.

FIG. 5 is an exploded view of the example shock end mount 202. As disclosed above, the frame bracket 314 of the shock end mount 202 includes the first and second threaded openings 316, 318, which form the first frame attachment portion 315. The first and second threaded openings 316, 318 can receive first and second threaded fasteners 501, 503 to couple the frame bracket 314 to the first shock attachment portion 146 (FIG. 1) on the rocker 140 (FIG. 1) of the bicycle 100 (FIG. 1). In the illustrated example, the frame bracket 314 also has a load translating member 502. In this example, the load translating member 502 is a wall of the frame bracket 314, referred to herein as the wall 502. The wall 502 has an opening 504.

As shown in FIG. 5, the first end 204 of the shock absorber 200 has the first eyelet 500. The shock end mount 202 includes a post bracket 506. When the shock end mount 202 is assembled, the post bracket 506 is coupled to the first end 204 of the shock absorber 200. In particular, in this example, the post bracket 506 is coupled to the first eyelet 500. When the shock end mount 202 is assembled, the frame bracket 314 is moveable relative to the post bracket 506, which enables relative movement between the first frame attachment portion 315 and the shock absorber 200.

In the illustrated example, the post bracket 506 includes a base 508, a post 510, first and second walls 512, 514, and a cap 516. The post 510 is coupled to and extends upward from the base 508. The first and second walls 512, 514 are coupled to and extend downward from the base 508. When the shock end mount 202 is assembled, the post 510 extends through the opening 504 in the wall 502 of the frame bracket 314, and the cap 516 is coupled to the distal end of the post 510 via a fastener 518 (e.g., a bolt, a screw). In some examples, the shock end mount 202 has an anti-rotation mechanism to prevent or limit rotation or twisting of the shock absorber 200 relative to the frame bracket 314 (and, thus, between the shock absorber 200 and the frame 102 (FIG. 1)). For example, in this example, the post 510 and the opening 504 in the wall 502 have a rectangular cross-section, which limits or prevents twisting or rotating between the frame bracket 314 and the post bracket 506. In the illustrated example, the shock end mount 202 includes a bushing 520 to be disposed in the opening 504 of the wall 502. The bushing 520 provides a smooth interface for the post 510 to slide through the opening 504. The first and second walls 512, 514 have openings that align with the first eyelet 500. In the illustrated example, the post bracket 506 is coupled to the first eyelet 500 via first and second fasteners 522, 524. In this example, the first fastener 522 is a bolt and the second fastener 524 is a barrel nut (e.g., an Allen head barrel nut). The first and second fasteners 522, 524 can be inserted through the first and second walls 512, 514 and into the first eyelet 500 and screwed together. In some examples, when the post bracket 506 is coupled to the first eyelet 500, the post bracket 506 is not pivotable about the first eyelet 500. However, in other examples, the post bracket 506 is pivotable about the first eyelet 500. In some examples, the base 508, the post 510, and the first and second walls 512, 514 are constructed as a single unitary part or component (e.g., a monolithic structure). In other examples, the base 508, the post 510, and/or the first and second walls 512, 514 can be constructed as separate parts that are coupled together.

In the illustrated example, the shock end mount 202 includes a first cushioning member 526 and a second cushioning member 528. In this example, the first and second cushioning members 526, 528 are implemented as elastomeric members, referred to herein as a first elastomeric member 526 and a second elastomeric member 528. When the shock end mount 202 is assembled, the first and second elastomeric members 526, 528 are disposed between the post bracket 506 and the frame bracket 314. In particular, the first elastomeric member 526 is disposed between the base 508 and the wall 502, and the second elastomeric member 528 is disposed between the cap 516 and the wall 502. The first and second cushioning members 526, 528 act as springs to enable relative movement between frame bracket 314 and the post bracket 506. In the illustrated example, the first and second elastomeric members 526, 528 are cuboid-shaped. However, in other examples, the first and/or second elastomeric members 526, 528 can have a different shape (e.g., disk-shaped). The first and second elastomeric members 526, 528 include respective openings 530, 532. When the shock end mount 202 is assembly, the post 510 extends through the opening 530 of the first elastomeric member 526, through the opening 504 of the wall 502, and through the opening 532 of the second elastomeric member 528.

Figure 7:
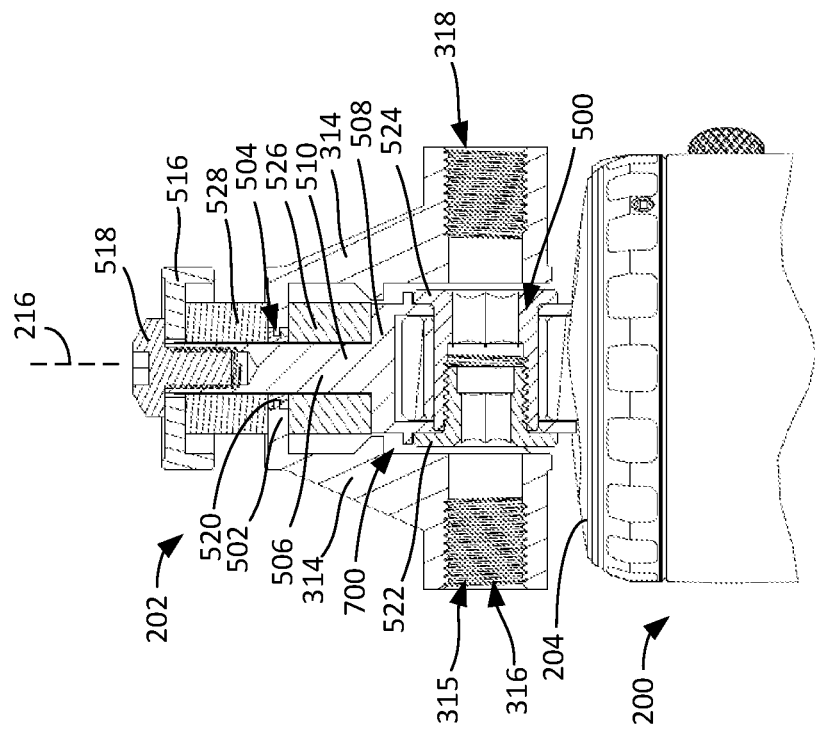
FIG. 7 is a cross-sectional view of the example shock end mount taken along line B-B of FIG. 6.
Figure 6:
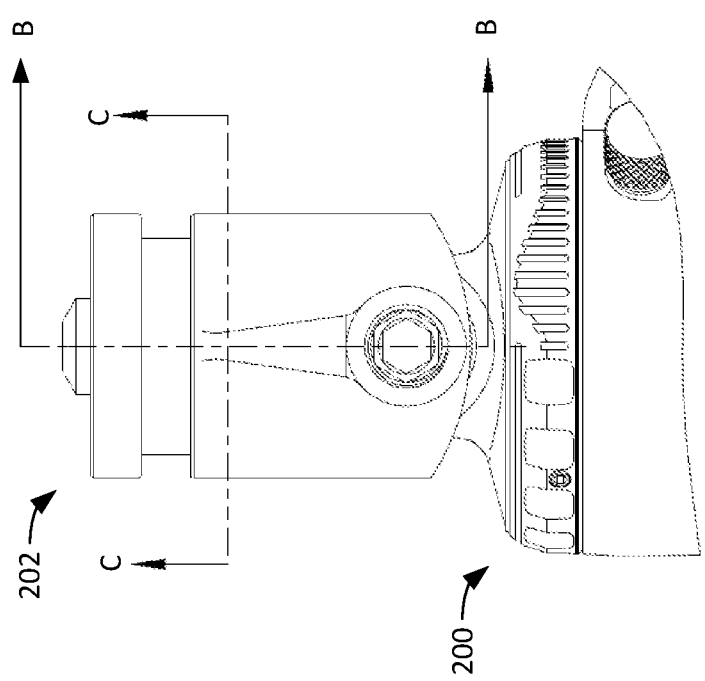
FIG. 6 is an enlarged side view of the example shock end mount and the example shock absorber of FIG. 2.

FIG. 6 is an enlarged side view of the shock end mount 202 on the shock absorber 200. FIG. 7 is a cross-sectional view of the shock end mount 202 taken along line B-B of FIG. 6. As shown in FIG. 7, the frame bracket 314 defines a cavity 700. The first eyelet 500 is disposed in the cavity 700. The post bracket 506 is coupled to the first eyelet 500 and extends upward from the first eyelet 500 and through the wall 502. The first and second threaded openings 316, 318 extend through the frame bracket 314 and into the cavity 700. As disclosed above, the first and second threaded openings 316, 318 can receive respective fasteners (e.g., bolts) to couple the frame bracket 314 to the frame 102 of the bicycle 100. However, neither of the fasteners extends entirely through the frame bracket 314. This enables the post bracket 506 and the first eyelet 500 to move up and down in the cavity 700 relative to the frame bracket 314. In some examples, the distance between the first frame attachment portion 315 to the top of the fastener 518 may be less than a certain height to ensure the shock end mount 202 fits on the frame 102 (FIG. 1). For example, the height may be less than 20 mm, 30 mm, 40 mm, etc.

As shown in FIG. 6, the first and second fasteners 522, 524 are threadably coupled in the first eyelet 500 to couple the post bracket 506 to the first eyelet 500. The post 510 extends upward (in the orientation in FIG. 7) through the first elastomeric member 526, the wall 502, and the second elastomeric member 528. The cap 516 is coupled to the post 510 via the fastener 518. The first and second elastomeric members 526, 528 are aligned along the longitudinal axis 216 of the shock absorber 200. The frame bracket 314 is moveable up and down relative to the post bracket 506 along the longitudinal axis 216, and vice versa. The bushing 520 is disposed in the opening 504 in the wall 502. The post 510 is slidable through bushing 520, which forms a low friction surface between the post 510 and the wall 502. This reduces wear on the frame bracket 314 and the post bracket 506. The bushing 520 can be constructed of any material. In some examples, the bushing 520 is constructed of Teflon®. In other examples, the bushing 520 can be constructed of another material, such as Delrin®.

In the illustrated example of FIG. 7, the first elastomeric member 526 is clamped (e.g., axially constrained) between the base 508 of the post bracket 506 and the wall 502 of the frame bracket 314. Further, the second elastomeric member 528 is clamped (e.g., axially constrained) between the cap 516 of the post bracket 506 and the wall 502 of the frame bracket 314. Therefore, the first elastomeric member 526 biases the post bracket 506 downward relative to the frame bracket 314, and the second elastomeric member 528 biases the post bracket 506 in the opposite direction relative to the frame bracket 314. In some examples, the first and second elastomeric members 526, 528 are preloaded (i.e., in a slightly compressed state). The first and second elastomeric members 526, 528 are disposed above the first frame attachment portion 315 in FIG. 7 and, thus, are outside of the region R1 (FIG. 4).

The first and second elastomeric members 526, 528 can be constructed of any elastomeric material. In some examples, the first and second elastomeric members 526, 528 are constructed of nitrile rubber (e.g., 50 Shore A nitrile rubber). In other examples, the first and second elastomeric members 526, 528 can be constructed of other types of rubber (e.g., butyl rubber, ethylene propylene diene monomer (EPDM) rubber, etc.), silicone, polyurethane, or a viscoelastic material. In some examples, the first and second elastomeric members 526, 528 have the same hardness. For example, the first and second elastomeric members 526, 528 may have a durometer of about 50 Shore A (e.g., ±5). In other examples, the first and second elastomeric members 526, 528 can have a higher or lower durometer. In other examples, the first and second elastomeric members 526, 528 can have a different hardness that each other. For example, the first elastomeric member 526 may have a hardness of a first durometer, and the second elastomeric member 528 may have a hardness of a second durometer that is higher than the first durometer.

Figure 8:
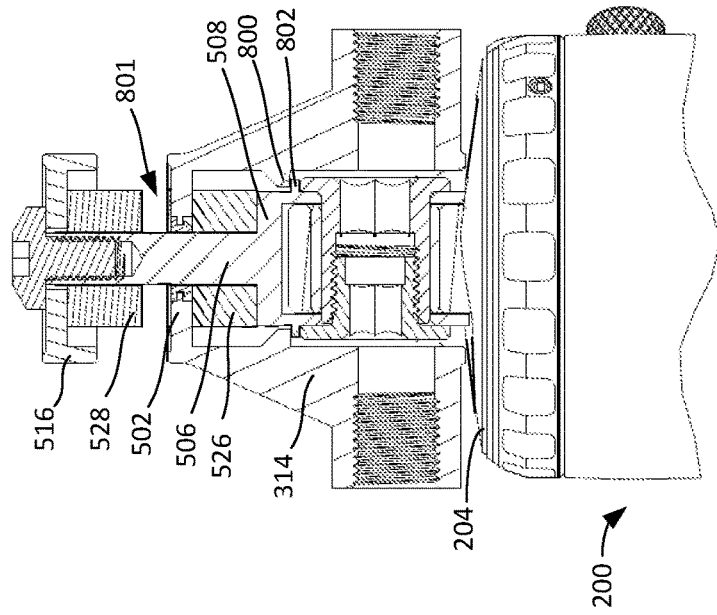
FIG. 8 shows the example shock end mount of FIG. 7 in response to a compressive force.

The first and second elastomeric members 526, 528 compress and expand in response to compression and rebound forces to enable relative movement between the frame bracket 314 and the post bracket 506 and, thus, between the shock absorber 200 and the first frame attachment portion 315. For example, when a compressive force is first applied to the suspension component 136 (e.g., when riding over a bump), the frame bracket 314 is forced downward (in FIG. 7) and/or the post bracket 506 is forced upward (in FIG. 7). Before the breakaway force of the shock absorber 200 is reached, the first elastomeric member 526 is compressed between the base 508 and the wall 502, which enables the frame bracket 314 to move downward relative to the first end 204 of the shock absorber 200 and, thus, enables the first frame attachment portion 315 to move relative to the shock absorber 200. An example of this motion is shown in FIG. 8. As shown in FIG. 8, the frame bracket 314 has moved downward relative to the post bracket 506 and, thus, toward the first end 204 of the shock absorber 200. The first elastomeric member 526 has been compressed. Further, because the frame bracket 314 is moved away from the second elastomeric member 528, the second elastomeric member 528 expands in the space between the cap 516 and the wall 502. In some examples, when the frame bracket 314 is moved a certain distance, a gap 801 is formed between the second elastomeric member 528 and the frame bracket 314 (and/or a gap may be formed between the second elastomeric member 528 and the cap 516). However, in other examples, the second elastomeric member 528 is sized such that when expanded, the second elastomeric member 528 maintains contact with both the cap 516 and the wall 502 and, thus, no gap is formed. This can enable a smooth transition when the frame bracket 314 is eventually moved in the opposite direction. In some examples, the second elastomeric member 528 is pre-loaded (pre-compressed), such that the elastomeric member 528 has enough available expansion to cover the travel between the post bracket 506 and the frame bracket 314. In some examples, the second elastomeric member 528 is coupled (e.g., via an adhesive, via a fastener, etc.) to the cap 516 and the wall 502. In such an example, the second elastomeric member 528 may be pulled into tension. Therefore, during a compression movement (i.e., when the first end 204 is moved toward the frame bracket 314 or vice versa), the first elastomeric member 526 is in a compressed state, and the second elastomeric member 528 is in an expanded state (or a tension state).

In some examples, the distance the frame bracket 314 can move relative to the post bracket 506 is limited. For example, as shown in FIG. 8, the frame bracket 314 has a protrusion 800 extending radially inward. In the position shown in FIG. 8, the protrusion 800 has engaged a flange 802 on the base 508 of the post bracket 506, which prevents further movement downward. In other examples, other structures or interfaces may be provided to limit the distance of the movement. After the compressive force is removed, the first elastomeric member 526 biases the base 508 and the wall 502 away from each other, which moves the frame bracket 314 upward relative to the post bracket 506 and, thus, upward relative to the first end 204 of the shock absorber 200.

Figure 9:
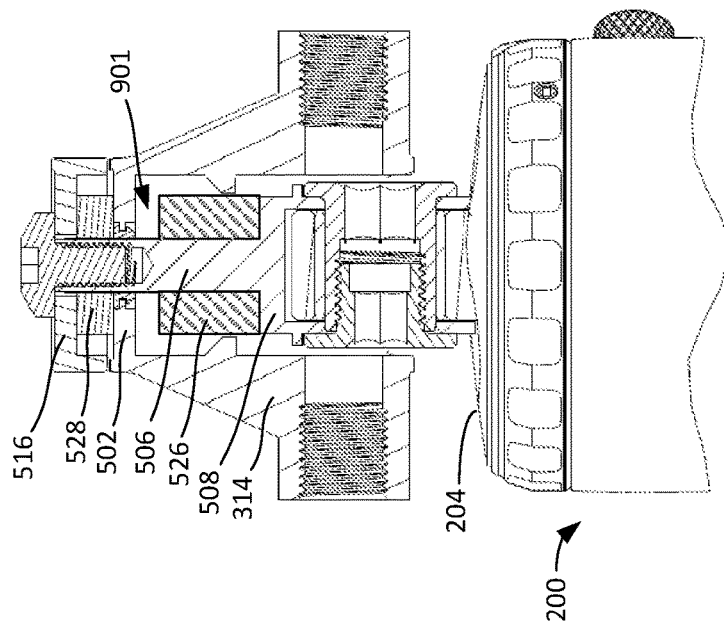
FIG. 9 shows the example shock end mount of FIG. 7 in response to a rebound or extensive force.

Similarly, when a rebound (expanding) force is applied to the suspension component 136 (e.g., from the spring 210 (FIG. 2)), the first and second elastomeric members 526, 528 enable relative movement of the frame bracket 314 and the post bracket 506. An example of this motion is shown FIG. 9. For example, the frame bracket 314 can be moved upward relative to the post bracket 506 (and vice versa) and, thus relative to the first end 204 of the shock absorber 200. As shown in FIG. 9, the second elastomeric member 528 is compressed between the cap 516 and the wall 502. Further, because the frame bracket 314 is moved away from the first elastomeric member 526, the first elastomeric member 526 expands in the space between the base 508 and the wall 502. In some examples, a gap 901 is formed between the first elastomeric member 526 and the frame bracket 314 (and/or a gap may be formed between the first elastomeric member 526 and the base 508). However, in other examples, the first elastomeric member 526 is sized such that when expanded, the first elastomeric member 526 maintains contact with both the base 508 and the wall 502 and, thus, no gap is formed. This can enables a smooth transition when the frame bracket 314 is eventually moved in the opposite direction. In some examples, the first elastomeric member 526 is pre-loaded (pre-compressed), such that the elastomeric member 528 has enough available expansion to cover the travel between the post bracket 506 and the frame bracket 314. In some examples, the first elastomeric member 526 is coupled (e.g., via an adhesive, via a fastener, etc.) to the base 508 and the wall 502. In such an example, the first elastomeric member 526 may be pulled into tension. In some examples, the first and/or second elastomeric members 526, 528 can have variable spring rates, such that the spring rate(s) change over the compression and tension movements. This may be used to eliminate a potential gap. During a rebound or expansion movement (i.e., when the first end 204 is moved away from the frame bracket 314 or vice versa), the second elastomeric member 528 is in a compressed state, and the first elastomeric member 526 is in an expanded state (or a tension state). Therefore, as shown in FIG. 8, the first elastomeric member 526 is loaded in compression when the shock absorber 200 is compressed, and, as shown in FIG. 9, the second elastomeric member 528 is loaded in compression when the shock absorber 200 is loaded in tension (or in a rebound state). As such, the first elastomeric member 526 may be referred to as a compression direction member (because it is under compression when the shock absorber 200 is compressed), and the second elastomeric member 528 may be referred to as a rebound direction member (because it is under compression when the shock absorber 200 is expanded).

In some examples, the distance the frame bracket 314 can move relative to the post bracket 506 is limited. For example, as shown in FIG. 9, the frame bracket 314 has engaged the cap 516 of the post bracket 506, which prevents further movement upward. In other examples, other structures or interfaces may be provided to limit the distance of the movement. After the rebound force is removed, the second elastomeric member 528 biases the cap 516 and the wall 502 away from each other, which moves the frame bracket 314 downward relative to the post bracket 506 and, thus, toward the first end 204 of the shock absorber 200. In this manner, the shock end mount 202 enables relative movement between the first frame attachment portion 400 and the first end of the shock absorber 200 before the breakaway forces of the shock absorber 200 are reached.

In some examples, the frame bracket 314 and the post bracket 506 are movable about 2 mm relative to each other in either direction from the position shown in FIG. 7. This allows about 4 mm of travel between the first frame attachment portion 315 and the first end 204 of the shock absorber 200. In some examples, the total distance is defined by the limits shown in FIGS. 8 and 9. In other examples, depending on the magnitude of the force, the hardness of the first and second elastomeric members 526, 528, and/or the breakaway force of the shock absorber 200, the relative movement may be larger or smaller. Also, because the first and second elastomeric members 526, 528 are disposed on opposite sides of the wall 502 of the frame bracket 314, the net force to initiate movement in either direction is zero. Therefore, the example suspension component 136 does not require a certain force to overcome some friction or breakaway force to initiate movement. Instead, any net compressive or expansive force can result in relative movement of the frame relative to the shock absorber 200 and, thus, movement between one section of the frame 102 (e.g., the rear triangle 138) and another section of the frame 102 (e.g., the down tube 144). This results in less vibrations or shocks transmitted through the frame 102 to the rider.

The first and second elastomeric members 526, 528 also absorb high frequency, low amplitude vibrations that may otherwise not be absorbed by the shock absorber 200. For example, if riding over a washboard terrain, the first and second elastomeric members 526, 528 enable two portions of the frame 102 to flutter relative to each other. As such, these high frequency, lower amplitude vibrations are not transmitted through the handlebars 114 (FIG. 1) or pedals to the rider. Further, by having the first and second elastomeric member 526, 528 on opposite sides of the wall 502, rather than just one on one side, this arrangement reduces any gap between the wall 502 and the base 508 and the cap 516 that could cause an impact upon release of force. Therefore, in some examples, having an elastomeric member on both sides of the wall 502 results in a more stable and smoother movement. In some examples, instead of having two separate elastomeric members, one elastomeric member can be used that extends to both sides of the wall 502. For example, the elastomeric member may have slot that interacts with the wall 502, and a first portion of the elastomeric member is above the wall 502 and a second portion of the elastomeric member is below the wall 502. In other examples, only one elastomeric member may be implemented on one side of the wall 502. For example, in some instances, only the first elastomeric member 526 may be included, and not the second elastomeric member 528. In such an example, the first elastomeric member 526 may operate between compression and tension during the compression and expansion movements. Further, while in this example the cushioning members are implemented as the first and second elastomeric members 526, 528, in other examples, the cushioning member(s) can be implemented as springs (e.g., metallic coil springs, leaf springs, etc.) or other types of cushioning members that produce biased movement between two components. For example, a coil spring can be coupled between the base 508 and the wall 502. In such an example, the coil spring can provide force in either direction, in compression or extension.

Figure 10:
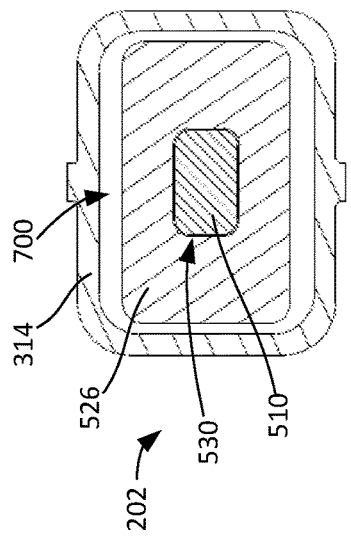
FIG. 10 is a cross-sectional view of the example shock end mount taken along line C-C of FIG. 6.

FIG. 10 is a cross-sectional view of the example shock end mount 202 taken along line C-C of FIG. 6. As shown in FIG. 10, the first elastomeric member 526 has a rectangular cross-section. In some examples, the first elastomeric member 526 is configured to have the same general shape as the cavity 700 of the frame bracket 314, which prevents the first elastomeric member 526 and the frame bracket 314 from rotating or twisting relative to each other. Further, as shown in FIG. 10, the opening 530 in the first elastomeric member 526 has the same general cross-sectional shape as the post 510, which prevents the post 510 and the first elastomeric member 526 from rotating or twisting relative to each other. The second elastomeric member 528 can have the same shape as the first elastomeric member 526. Further, the opening 504 (FIG. 5) in the wall 502 (FIG. 5) also has a rectangular cross-section that matches the post 510. This reduces or eliminates any potential twisting between the frame bracket 314 and the post bracket 506 (FIG. 5) and, thus, ensures the suspension component 136 (FIG. 2) remains aligned between the first and second shock attachment portions 146, 148 (FIG. 1) on the bicycle 100.

Figure 11:
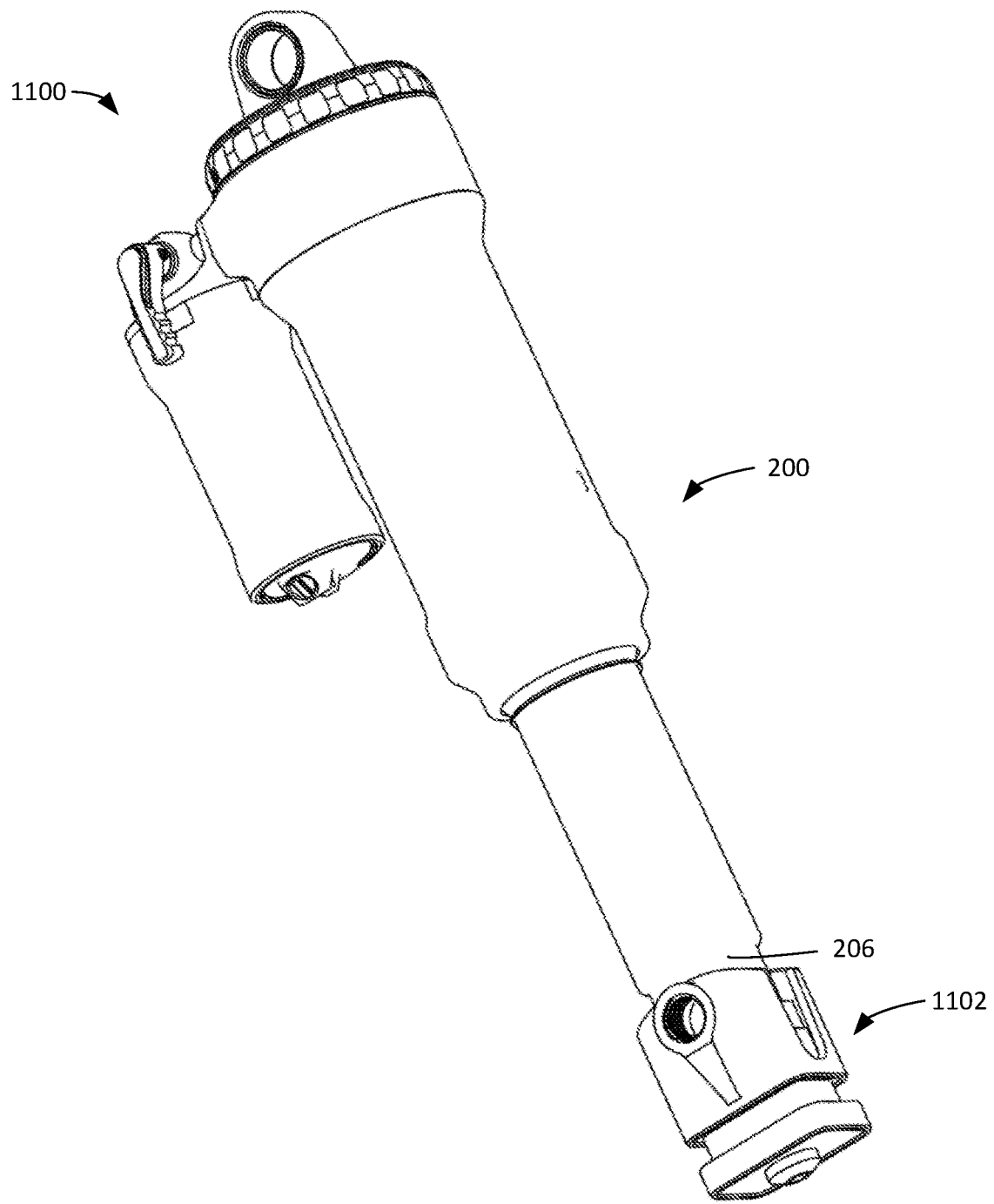
FIG. 11 is perspective view of another example suspension component that can be implemented on the example bicycle of FIG. 1.

FIG. 11 illustrates another example suspension component 1100 that can be implemented on the bicycle 100 (FIG. 1). The suspension component 1100 may also be referred to as a shock assembly. The suspension component 1100 includes the shock absorber 200 and another example shock end mount 1102. In this example, the shock end mount 202 is coupled to the second end 206 of the shock absorber 200. The shock end mount 1102 is substantially the same as the shock end mount 202 disclosed above. In particular, the shock end mount 202 acts to absorb vibrations and enable movement between the second end 206 of the shock absorber 200 and the second shock attachment portion 148 (FIG. 1) and, thus, enables movement between two sections of the frame 102 independent of the shock absorber 200. It is understood that any of the example structure or functions disclosed in connection with the shock end mount 202 can likewise apply to the shock end mount 1102 on the second end 206. Therefore, to avoid redundancy, many of the example structures and/or functions are not repeated herein.

FIGS. 12 and 13 are side views of the example suspension component 1100 (rotated about 90° from each other). In this example, the first eyelet 500 forms a first frame attachment portion 1200 for coupling the shock absorber 200 to the frame 102 (FIG. 1) at the first shock attachment portion 146 (FIG. 1). Further, in this example, the shock end mount 1102 includes or defines a second frame attachment portion 1202 where the shock end mount 1102 (and, thus, the suspension component 1100) can be coupled to the frame 102 of the bicycle 100. For example, the shock end mount 1102 includes a frame bracket 1204. The frame bracket 1204 includes first and second threaded openings 1206, 1208. The first and second threaded openings 1206, 1208 are configured to receive threaded fasteners (e.g., bolts). The frame bracket 1204 can be coupled to the frame 102 by inserting threaded fasteners through the frame 102 (e.g., at the second shock attachment portion 148 on the rocker 140) and into the first and second threaded openings 1206, 1208. Therefore, the first and second threaded openings 1204, 1206 form the second frame attachment portion 1202.

As shown in FIG. 13, the shock end mount 1102 is aligned along the longitudinal axis 216 of the shock absorber 200. The shock end mount 1102 enables relative movement between the shock absorber 200 and the second frame attachment portion 1202 and, thus, between the shock absorber 200 and the second shock attachment portion 148 (FIG. 1) on the frame 102 (FIG. 1). As disclosed in further detail herein, the shock end mount 1102 includes one or more cushioning members, such as elastomeric members (e.g., rubber pads). The cushioning member(s) is/are disposed outside of a region R2 between the first frame attachment portion 1200 (corresponding to the first eyelet 500) and the second frame attachment portion 1202 (corresponding to the first and second threaded openings 1206, 1208). For example, the cushioning member(s) is/are below the second frame attachment portion 1204 in FIG. 13. As such, the shock end mount 1102 does not interfere with or shorten the allowable size (e.g., length) or stroke distance of the shock absorber 200.

Figure 14:
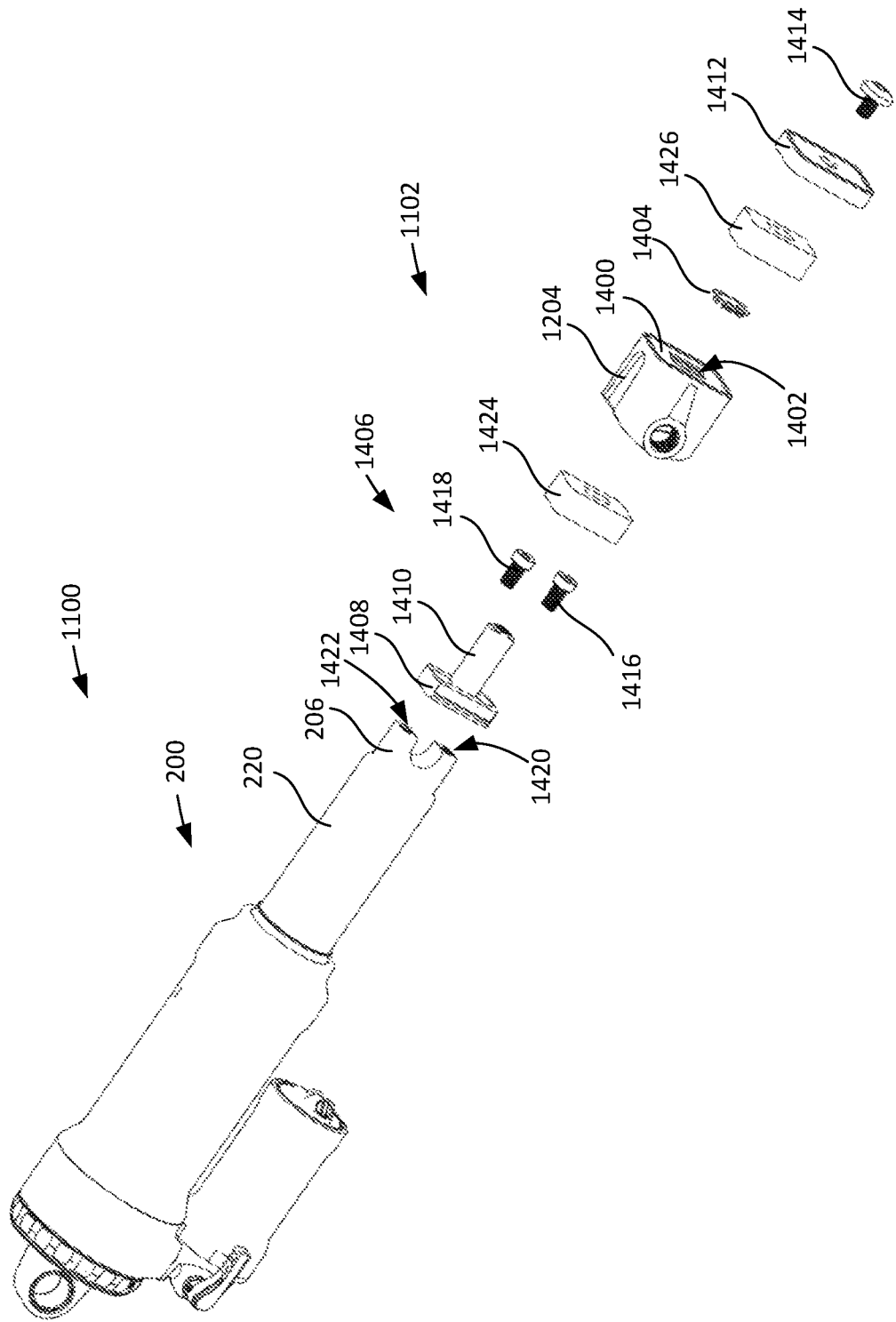
FIG. 14 is an exploded view of the example shock end mount of FIG. 11.

FIG. 14 is an exploded view of the example shock end mount 1102. In the illustrated example, the frame bracket 1204 includes a wall 1400 with an opening 1402. The shock end mount 1102 includes a bushing 1404 that can be disposed in the opening 1402. In the illustrated example, the shock end mount 1102 includes a post bracket 1406. When the shock end mount 1102 is assembled, the post bracket 1406 is coupled to the second eyelet 208. The post bracket 1406 is moveable relative to the frame bracket 1204, which enables relative movement between the second frame attachment portion 1202 and the shock absorber 200.

The post bracket 1406 is substantially the same as the post bracket 506 disclosed above. The post bracket 1406 includes a base 1408, a post 1410 coupled to and extending from the base 1408, and a cap 1412 that can be coupled to a distal end of the post 1410 via a fastener 1414 (e.g., a bolt). However, in this example, the post bracket 1406 is coupled to the second end 206 of the shock absorber 200 via first and second fasteners 1416, 1418. In particular, in this example, the second end 206 of the shock absorber 200 has threaded openings 1420, 1422 instead of an eyelet. When the shock end mount 1102 is assembled, the first and second fasteners 1416, 418 are inserted through the base 1408 and screwed into the threaded openings 1420, 1422, thereby coupling the post bracket 1406 to the second end 206 of the shock absorber 200. However, in other examples, the second end 206 of the shock absorber 200 can include an eyelet (e.g., such as the second eyelet 208 shown in FIGS. 2 and 3). In such an example, the post bracket 1406 can be the same as the post bracket 506 disclosed above. In the illustrated example, the shock end mount 1102 also includes a first elastomeric member 1424 and a second elastomeric member 1426.

Figure 16:
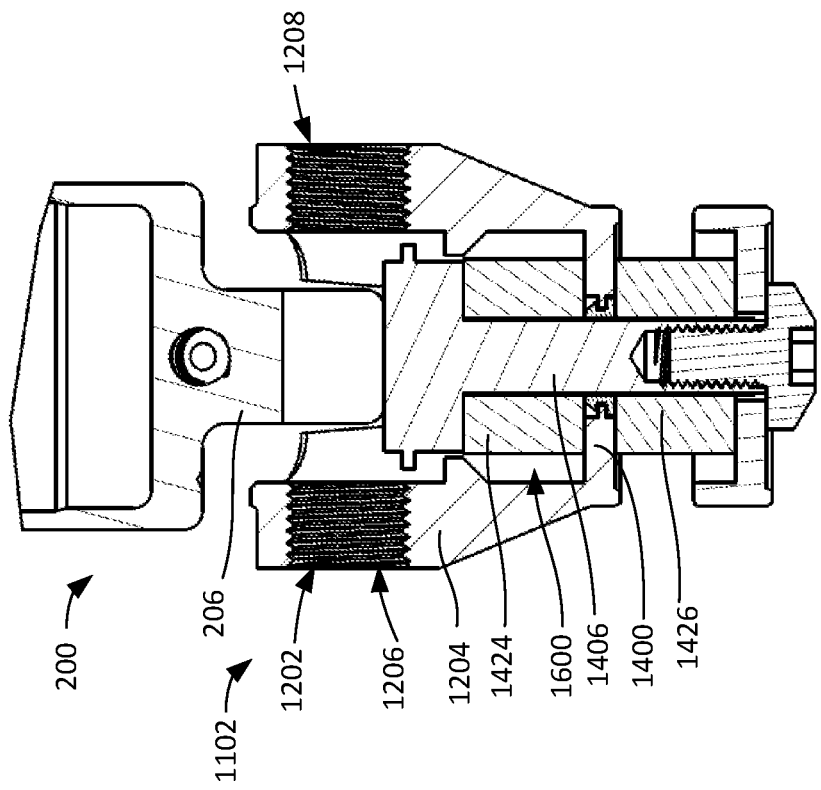
FIG. 16 is a cross-sectional view of the example shock end mount taken along line D-D of FIG. 15.
Figure 15:
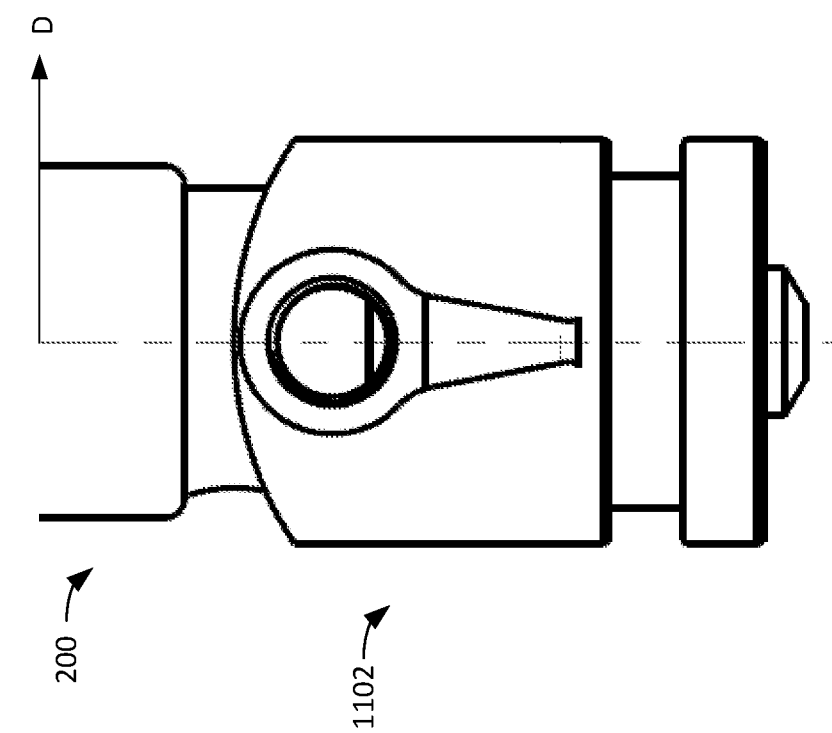
FIG. 15 is an enlarged side view of the example shock end mount and the example shock absorber of FIG. 11.

FIG. 15 is an enlarged side view of the example shock end mount 1102 on the shock absorber 200. FIG. 16 is a cross-sectional view of the shock end mount 1102 taken along line D-D of FIG. 15. As shown in FIG. 16, the frame bracket 1204 defines a cavity 1600. The post bracket 1406 is coupled to the second end 206 of the shock absorber 200 and extends downward and through the wall 1400 of the frame bracket 1204. The shock end mount 1102 operates the same as the shock end mount 202 disclosed above. Thus, to avoid redundancy, a describing of the relative movements is not repeated.

As disclosed above, the first and second threaded openings 1206, 1208 form the second frame attachment portion 1202. As shown in FIG. 14, the first and second elastomeric members 1424, 1426 are below the second frame attachment portion 1202 and, thus, are disposed outside of the region R2 (FIG. 13) between the first frame attachment portion 1200 (FIGS. 12 and 13) and the second frame attachment portion 1202. Therefore, the first and second elastomeric members 1424, 1426 do not interfere with or shorten the allowable space for the shock absorber 200.

Figure 17:
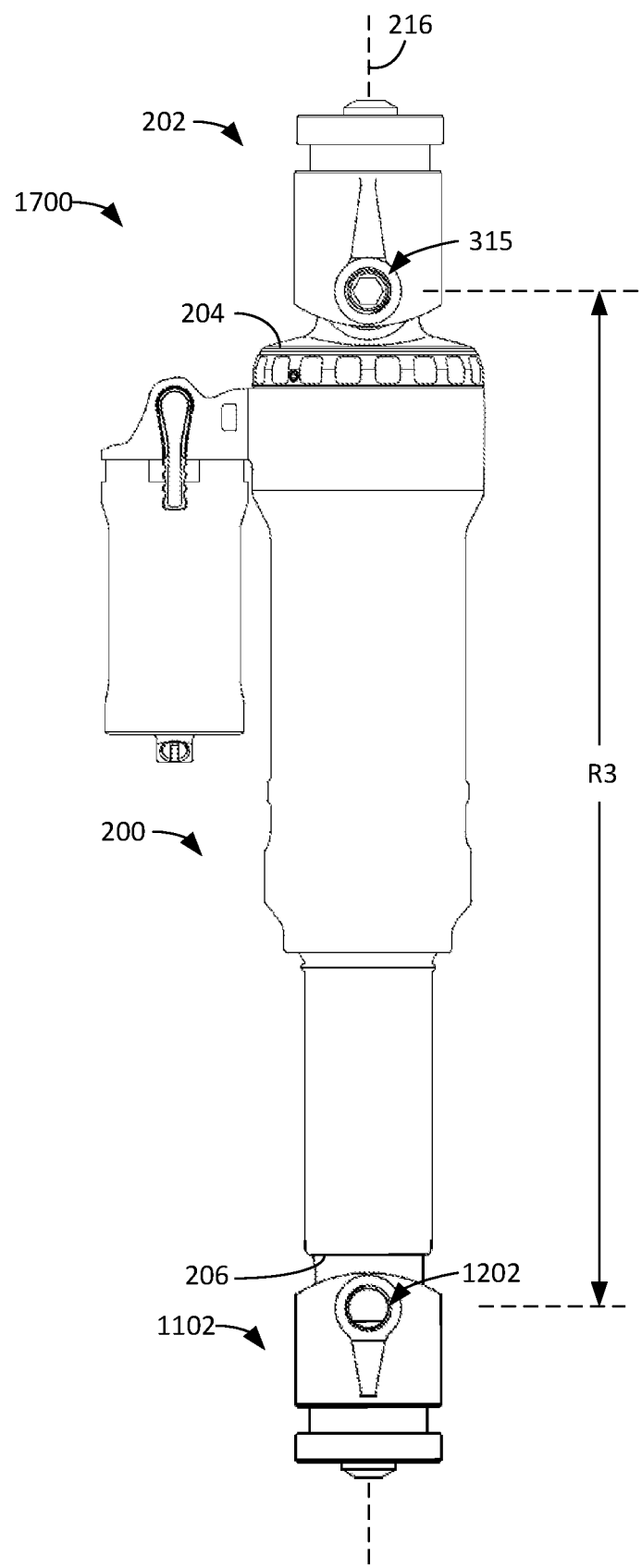
In FIG. 17, the example suspension component includes the example shock absorber of FIG. 2 and an example shock end mount coupled to a second end of the example shock absorber.

The examples shown in FIGS. 2-16 include a shock end mount coupled to one end of the shock absorber 200. However, in other examples, a shock end mount can be used on both ends of the shock absorber 200. For example, FIG. 17 shows an example suspension component 1700 that can be implemented on the bicycle 100 (FIG. 1). The suspension component 1700 may also be referred to as a shock assembly. In the illustrated example, the suspension component 1700 includes the shock absorber 200 with the shock end mount 202 (a first shock end mount) coupled to the first end 204 and the shock end mount 1102 (a second shock end mount) coupled to the second end 206. In the illustrated example, the first and second shock end mounts 202, 1102 are aligned along the longitudinal axis 216 of the shock absorber. The first and second shock end mounts 202, 1102 enable relative movement of the first and second shock attachment portions 146, 148 (FIG. 1) before the break away force for the shock absorber 200 is reached.

The first shock end mount 202 includes or defines the first frame attachment portion 315 (e.g., defined by the first and second threaded openings 316, 318 (FIGS. 3-5), and the second shock end mount 1102 includes or defines the second frame attachment portion 1202 (e.g., defined by the first and second threaded openings 1206, 1208 (FIGS. 12-14). The first shock end mount 202 includes the first and second elastomeric members 526, 528 (FIG. 5), and the second shock end mount 1102 includes the first and second elastomeric members 1424, 1426 (FIG. 14). The elastomeric members 526, 528, 1424, 1426 are disposed outside of a region R3 between the first frame attachment portion 315 and the second frame attachment portion 1202.

Figure 18:
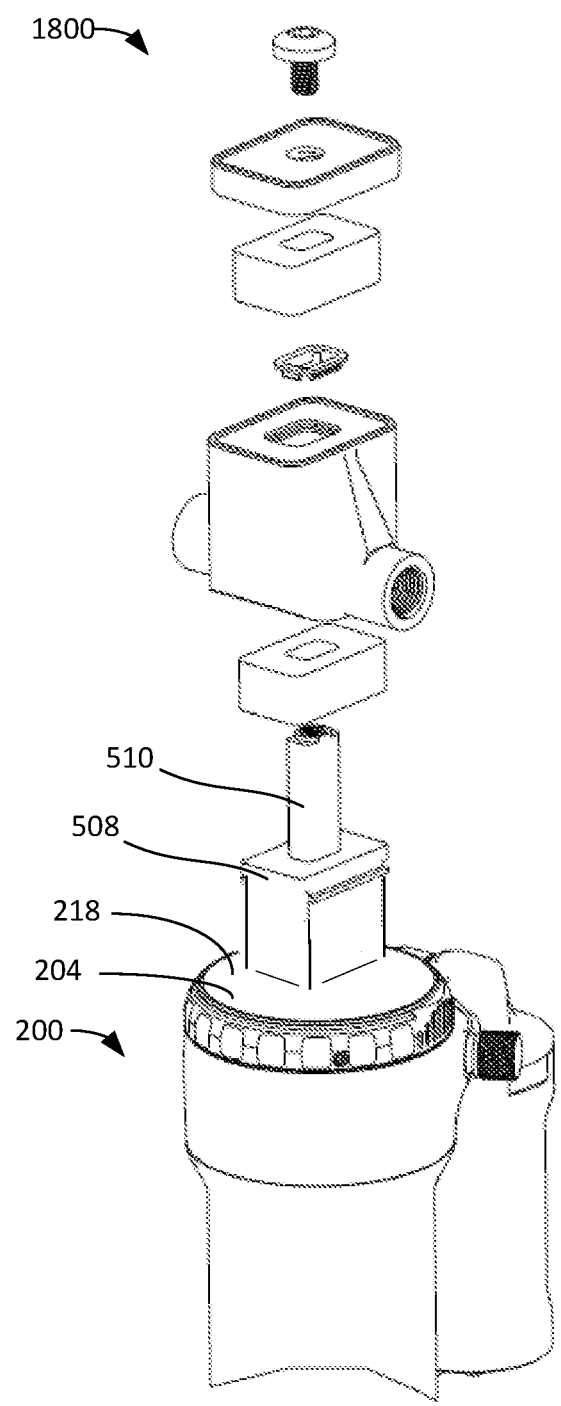
FIG. 18 is an exploded view of an example shock end mount having a post bracket integral with an end of the example shock absorber of FIG. 2.
Figure 20D:
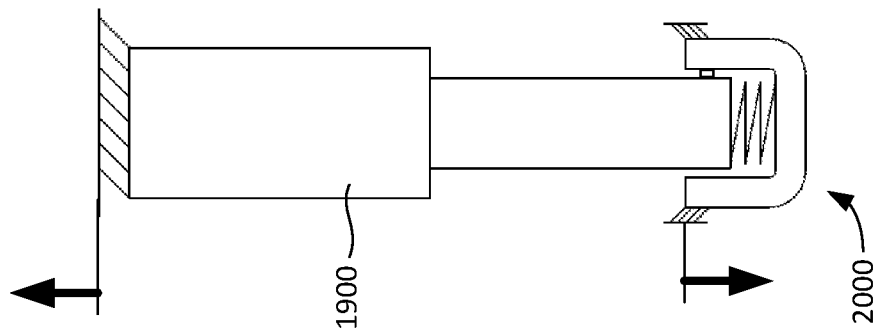
FIGS. 20A-20D are schematics of an example shock absorber and an example shock end mount on a second end of the example shock absorber in different states.
Figure 20C:
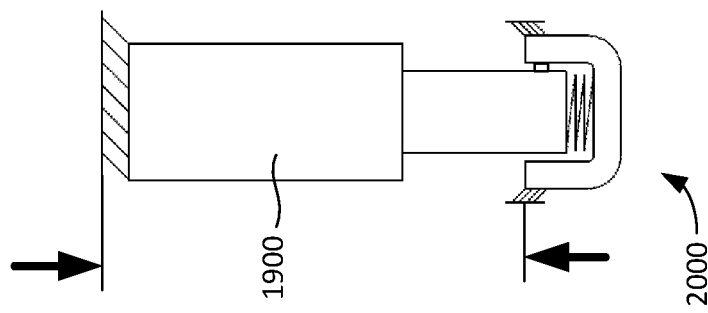
Figure 20B:
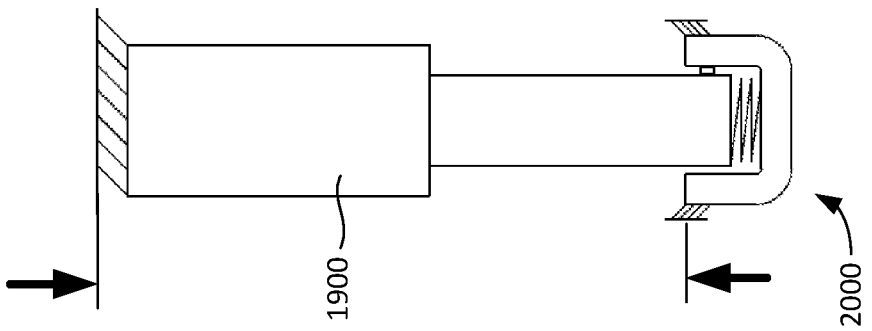
Figure 20A:
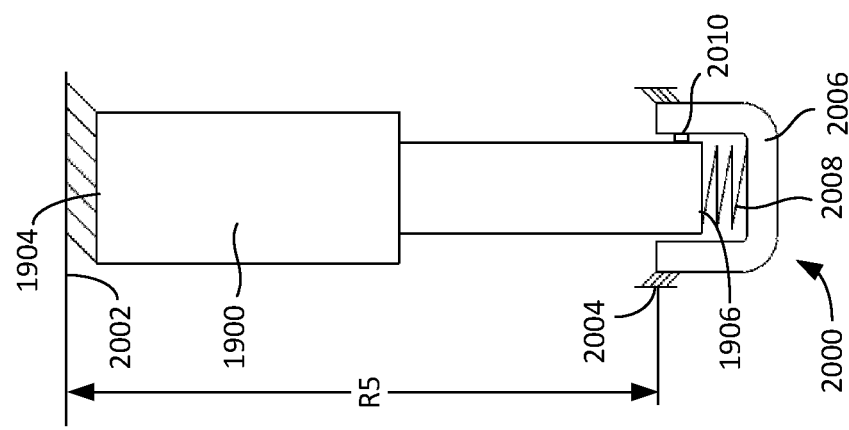

In the example of FIGS. 2-10, the post bracket 506 is a separate component that is coupled to the first end 204 of the shock absorber 200. However, in other examples, at least a portion of the post bracket 506 can be integral with the first end 204 of the shock absorber 200. For example, FIG. 18 shows an exploded view of an example shock end mount 1800 that is substantially the same as the shock end mount 202 of FIG. 2. However, in this example, the base 508 and the post 510 are integral with the first end 204 of the shock absorber 200. For example, the base 508 and the post 510 can be formed as a single monolithic structure with the cap 218

FIGS. 19A-19D are schematics of an example shock absorber 1900 and an example shock end mount 1902 in different states. The example shock absorber 1900 and the example shock end mount 1902 may correspond to the shock absorber 200 and the shock end mount 202 disclosed in connection with FIGS. 2-10 and may be implemented on the bicycle 100 (FIG. 1). Referring to FIG. 19A, the shock absorber 1900 has a first end 1904 and a second end 1906 opposite the first end 1904. The shock end mount 1902 includes a frame bracket 1908 (which may correspond to the frame bracket 314 (FIG. 3)) and a spring 1910 (which may correspond to the first and/or second elastomeric members 526, 528 (FIG. 5)) between the first end 1904 of the shock absorber 1900 and the frame bracket 1908. The frame bracket 1908 includes a first frame attachment portion 1912 that can be coupled to a first structure (e.g., a shock attachment portion on the bicycle 100). The first frame attachment portion 1912 may correspond to the first and second threaded openings 316, 318 (FIGS. 3-5). The second end 1906 of the shock absorber 200 includes a second frame attachment portion 1914 that can be coupled to a second structure (e.g., a shock attachment portion on the bicycle 100). The second frame attachment portion 1914 may correspond to the second eyelet 208 (FIG. 2). As shown in FIG. 19A, the spring 1910 is disposed outside of a region R4 between the first frame attachment portion 1912 and the second frame attachment portion 1914. Said another way, the distance between the first and second frame attachment portions 1912, 1914 is less than the distance between the spring 1910 and the second frame attachment portion 1914. Therefore, the shock end mount 1902 does not interfere with or obstruct the potential size of the body of the shock absorber 1900 and/or the stroke length of the shock absorber 1900.

In some examples, an anti-rotation mechanism 1916 is provided to prevent rotation or twisting between the shock absorber 1900 and the frame bracket 1908. The anti-rotation mechanism 1916 may correspond to the rectangular cross-sectional shape of the post 510 (FIG. 5) and the shape of the opening 504 (FIG. 5) in the wall 502 (FIG. 5) and/or the corresponding openings 530, 532 (FIG. 5) in the first and second elastomeric members 526, 528 (FIG. 5). In other examples, the anti-rotation mechanism 1916 can be implemented as another structure, such as a keyed slot and protrusion. Therefore, in this example, the anti-rotation mechanism 1916 forms means for preventing rotation between the shock absorber 1900 and the frame bracket 1908.

FIG. 19A shows the shock absorber 1900 and the shock end mount 1902 in a neutral state, such as when the bicycle 100 (FIG. 1) is riding on a flat surface. FIG. 19B shows the shock absorber 1900 and the shock end mount 1902 during an initial compression. This may occur when one or both of the structures at the first and second frame attachment portions 1912, 1914 are moved toward each other, such as when riding over a bump. As shown, the shock absorber 1900 has not yet compressed (compared to the neutral state in FIG. 19A), but the frame bracket 1908 has moved downward and the spring 1810 has compressed (shortened). The spring 1910 compresses, which enables the first frame attachment portion 1912 to move toward the first end 1904 of the shock absorber 1900. As such, the structures at the first and second frame attachment portions 1912, 1914 have moved closer without the shock absorber 1900 compressing.

FIG. 19C shows the shock absorber 1900 and the shock end mount 1902 after further compression. As shown, the shock absorber 1900 has compressed, which further shortens the distance between the structures at the first and second frame attachment portions 1912, 1914. In some examples, the height of the spring 1910 has not changed between the states in FIGS. 19B and 19C.

FIG. 19D shows the shock absorber 1900 and the shock end mount 1902 during an expansion or extension. This may occur when one or both of the structures at the first and second frame attachment portions 1912, 1914 are moved away from each other. For example, this may occur from the shock absorber 1900 rebounding or from an inertial effect of the suspension vehicle leaving the ground. As shown, the shock absorber 1900 has not expanded (compared to the neutral state in FIG. 19A), but the frame bracket 1908 has moved upward and the spring 1910 has expanded. As such, the structures as the first and second frame attachment portions 1912, 1914 have moved away from each other without the shock absorber 1900 expanding.

FIGS. 20A-20D are schematics of the example shock absorber 1900 and another example shock end mount 2000 in different states. In this example, the example shock end mount 2000 is coupled to the second end 1906 of the shock absorber 1900. This arrangement may correspond to the shock absorber 200 and the shock end mount 1102 shown in FIGS. 11-16. The first end 1904 includes a first attachment frame portion 2002 (e.g., the first eyelet 500 (FIG. 5)) to be coupled to a first structure, and the shock end mount 2000 includes a second frame attachment portion 2004 to be coupled to a second structure. The shock end mount 2000 includes a frame bracket 2006 and a spring 2008. The spring 2006 is outside of region R5 between the first frame attachment portion 2002 and the second frame attachment portion 2004. Therefore, the shock end mount 1902 does not interfere with or obstruct the potential size and/or stroke length of the shock absorber 1900. In some examples, an anti-rotation mechanism 2010 is provided to prevent rotation or twisting between the shock absorber 1900 and the frame bracket 2006. The anti-rotation mechanism 2010 may correspond to the rectangular cross-sectional shape of the post 1410 (FIG. 14) and the shape of the opening 1402 (FIG. 14) in the wall 1400 (FIG. 14) and/or the corresponding openings in the first and second elastomeric members 1424, 1426 (FIG. 14). In other examples, the anti-rotation mechanism 2010 can be implemented as another structure, such as a keyed slot and protrusion. Therefore, in this example, the anti-rotation mechanism 2010 forms means for preventing rotation between the shock absorber 1900 and the frame bracket 2006.

FIGS. 20A-20D show the shock absorber 1900 and the shock end mount 2000 in the same states as FIGS. 19A-19D. The example shock end mount 2000 enables relative movement between the second end 1906 of the shock absorber 1900 and the first frame attachment portion 2004, which is similar to the movement described in connection with FIGS. 19A-19D. Thus, to avoid redundancy, a description of the states is not repeated.

Figure 21D:
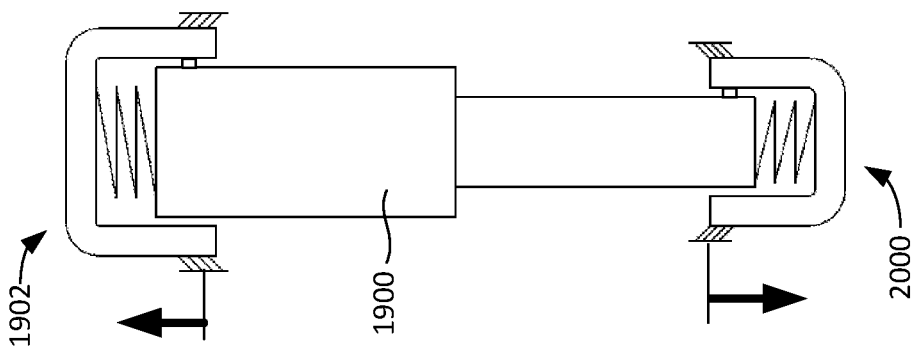
FIGS. 21A-21D are schematics of an example shock absorber and example frame springs mounts on both ends of the example shock absorber in different states.
Figure 21C:
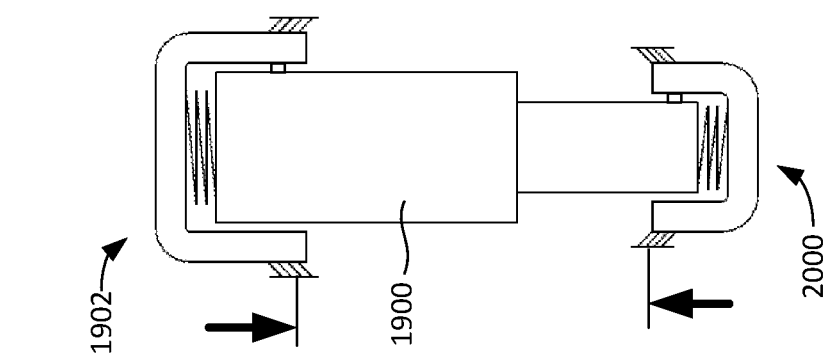
Figure 21B:
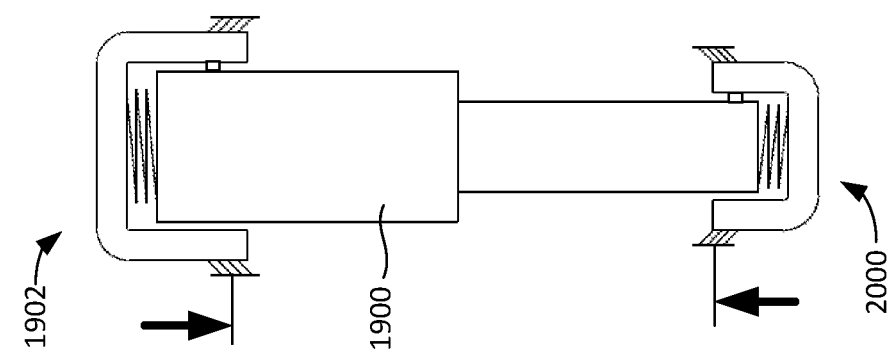
Figure 21A:
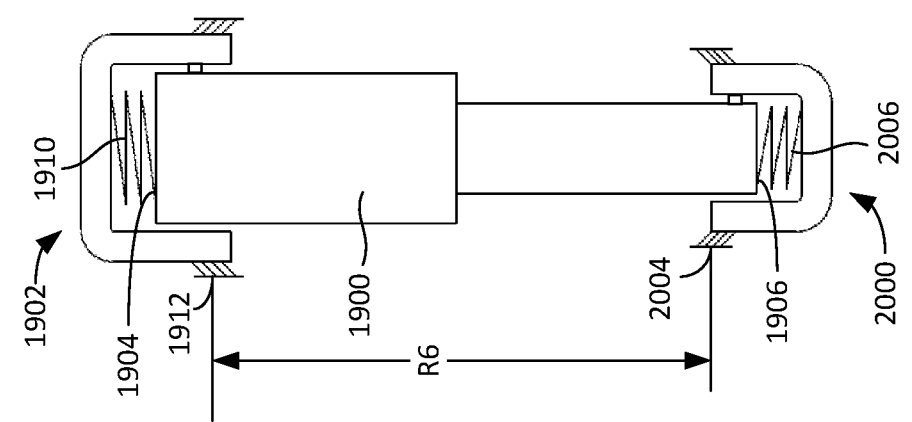

FIGS. 21A-21D are schematics of the example shock absorber 1900 with the shock end mount 1902 on the first end 1904 and the shock end mount 2000 on the second end 1906 in different states. As shown in FIG. 21A, the springs 1910, 2006 are disposed outside of a region R6 between the first frame attachment portion 1912 and the second frame attachment portion 2004. Therefore, the shock end mounts 1902, 2000 do not interfere with or obstruct the potential size and/or stroke length of the shock absorber 1900. FIGS. 21A-21D show the shock absorber 1900 and the shock end mounts 1902, 2000 in the same states as FIGS. 19A-19D and FIGS. 20A-20D. The example shock end mounts 1902, 2000 enable relative movement between the structures at the first and second frame attachment portions 1912, 2004 without compression or expansion of the shock absorber 1900. Thus, to avoid redundancy, a description of the states is not repeated.

While the example shock end mounts disclosed herein are described in connection with a rear shock absorber, the example shock end mounts can be similarly implemented in connection with shock absorbers in other locations and/or other types of suspension components on a vehicle. For example, any of the example shock end mounts can be implemented in the front fork 108. As another example, any of the example shock end mounts can be implemented in connection with a suspension component used in connection with another component on the bicycle 100, such as the seat post 112.

From the foregoing, it will be appreciated that example shock end mounts have been disclosed that improve shock absorption in suspension components. The example shock end mounts disclosed herein enable relative movement between two frame attachment portions (and, thus, two sections of a frame or other structure) of a bicycle before the breakaway force of the shock absorber is reached. This provides additional compression force cushioning and extension force cushioning. The example shock end mounts disclosed herein also absorb high frequency vibrations and, thus, reduce vibrations that are felt by the rider. This creates a more comfortable ride for the rider and improves rider confidence. Further, the example shock end mounts do not interference with the size of the shock absorber and/or it's stroke length. As such, the shock end mount can be used with an existing shock absorber.

Example systems, apparatus, and articles of manufacture for bicycles (and/or other vehicles) are disclosed herein. Examples and example combinations disclosed herein include the following:

Example 1 a suspension component for a bicycle. The suspension component comprises a shock absorber including a spring and a damper configured in a telescoping arrangement. The shock absorber has a first end and a second end opposite the first end. The second end has an eyelet. The suspension component also includes a shock end mount coupled to the first end of the shock absorber. The shock end mount includes a frame bracket. The frame bracket includes a first frame attachment portion to be coupled to a frame of the bicycle. The eyelet on the second end of the shock absorber defines a second frame attachment portion to be coupled to the frame of the bicycle. The shock end mount includes an elastomeric member to enable relative movement between the shock absorber and the first frame attachment portion. The elastomeric member is disposed outside of a region between the first frame attachment portion and the second frame attachment portion.

Example 2 includes the suspension component of Example 1, wherein the shock end mount includes a post bracket coupled to the first end of the shock absorber. The frame bracket is moveable relative to the post bracket.

Example 3 includes the suspension component of Example 2, wherein the eyelet is a second eyelet. The first end of the shock absorber has a first eyelet. The post bracket is coupled to the first eyelet.

Example 4 includes the suspension component of Example 3, wherein the post bracket is coupled to the first eyelet via first and second fasteners inserted into the first eyelet.

Example 5 includes the suspension component of Example 2, wherein at least a portion of the post bracket is integral to the first end of the shock absorber.

Example 6 includes the suspension component of any of Examples 2-5, wherein the elastomeric member is disposed between the post bracket and the frame bracket.

Example 7 includes the suspension component of Example 6, wherein the post bracket includes a base and a post extending the base. The post extends through the elastomeric member. The frame bracket includes a wall. The elastomeric member is disposed between the base of the post bracket and the wall of the frame bracket.

Example 8 includes the suspension component of Example 7, wherein the elastomeric member is a first elastomeric member. The shock end mount includes a second elastomeric member. The second elastomeric member is disposed outside of a region between the first frame attachment portion and the second frame attachment portion.

Example 9 includes the suspension component of Example 8, wherein the first elastomeric member and the second elastomeric member are disposed on opposite sides of the wall of the frame bracket.

Example 10 includes the suspension component of Example 9, wherein the post bracket includes a cap coupled to a distal end of the post. The second elastomeric member is disposed between the cap and the wall.

Example 11 includes the suspension component of Example 10, wherein the post extends through the first elastomeric member, the wall, and the second elastomeric member.

Example 12 includes the suspension component of any of Examples 1-11, wherein the shock end mount includes a post bracket coupled to the first end of the shock absorber. The post bracket has a post extending through an opening in a wall of the frame bracket. The post and the opening have a rectangular cross-section to limit rotation between the post bracket and the frame bracket.

Example 13 is a suspension component for a bicycle. The suspension component comprises a shock absorber including a spring and a damper configured in a telescoping arrangement. The shock absorber has a first end and a second end opposite the first end. The suspension component includes a first shock end mount coupled to the first end of the shock absorber. The first shock end mount includes a first frame attachment portion to be coupled to a frame of the bicycle. The first shock end mount includes a first cushioning member to enable relative movement between the first end of the shock absorber and the first frame attachment portion. The suspension component also includes a second shock end mount coupled to the second end of the shock absorber. The second shock end mount includes a second frame attachment portion to be coupled to the frame for the bicycle. The second shock end mount includes a second cushioning member to enable relative movement between the second end of the shock absorber and the second frame attachment portion. The first cushioning member and the second cushioning member are disposed outside of a region between the first frame attachment portion and the second frame attachment portion.

Example 14 includes the suspension component of Example 13, wherein the first end has a first eyelet. The first shock end mount is coupled to the first eyelet.

Example 15 includes the suspension component of Examples 13 or 14, wherein the first and second shock end mounts are aligned along a longitudinal axis of the shock absorber.

Example 16 includes the suspension component of any of Examples 13-15, wherein the first and second cushioning members are constructed of nitrile rubber Example 17 includes the suspension component of any of Examples 13-16, wherein, the first end mount includes a first frame bracket, the first frame bracket including the first frame attachment portion, the first end mount includes means for preventing rotation between the shock absorber and the first frame bracket, the second end mount includes a second frame bracket, the second frame bracket including the second frame attachment portion, and the second end mount includes means for preventing rotation between the shock absorber and the second frame bracket.

Example 18 includes a shock end mount to couple a shock absorber to a frame of a bicycle. The shock end mount comprises a frame bracket including a threaded opening to receive a threaded fastener to couple the frame bracket to the frame of the bicycle. The frame bracket has a wall with an opening. The shock end mount includes a post bracket to be coupled to the shock absorber. The post bracket includes a base, a post extending from the base, and a cap coupled to a distal end of the cap. The post extends through the wall of the frame bracket. The post and the opening in the wall having a rectangular cross-section to limit rotation between the frame bracket and the post bracket. The shock end mount also includes a first elastomeric member disposed between the base and the wall, and a second elastomeric member disposed between the cap and the wall. The first and second elastomeric members are to enable relative movement between the frame bracket and the shock absorber.

Example 19 includes the shock end mount of Example 18, wherein the frame bracket defines a cavity. The first elastomeric member is disposed in the cavity.

Example 20 includes the shock end mount of Examples 18 or 19, further including a bushing in the opening. The post of the post bracket extending through the bushing.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A suspension component for a bicycle, the suspension component comprising:
   a shock absorber including a spring and a damper configured in a telescoping arrangement, the shock absorber having a first end and a second end opposite the first end, the second end having an eyelet; and
   a shock end mount coupled to the first end of the shock absorber, the shock end mount including a frame bracket, the frame bracket including a first frame attachment portion to be coupled to a frame of the bicycle, the eyelet on the second end of the shock absorber defining a second frame attachment portion to be coupled to the frame of the bicycle, the shock end mount including an elastomeric member to enable relative movement between the shock absorber and the first frame attachment portion, the elastomeric member disposed outside of a region between the first frame attachment portion and the second frame attachment portion.

2. The suspension component of claim 1, wherein the shock end mount includes a post bracket coupled to the first end of the shock absorber, the frame bracket moveable relative to the post bracket.

3. The suspension component of claim 2, wherein the eyelet is a second eyelet, the first end of the shock absorber having a first eyelet, the post bracket coupled to the first eyelet.

4. The suspension component of claim 3, wherein the post bracket is coupled to the first eyelet via first and second fasteners inserted into the first eyelet.

5. The suspension component of claim 2, wherein at least a portion of the post bracket is integral to the first end of the shock absorber.

6. The suspension component of claim 2, wherein the elastomeric member is disposed between the post bracket and the frame bracket.

7. The suspension component of claim 6, wherein the post bracket includes a base and a post extending the base, the post extending through the elastomeric member, the frame bracket including a wall, the elastomeric member disposed between the base of the post bracket and the wall of the frame bracket.

8. The suspension component of claim 7, wherein the elastomeric member is a first elastomeric member, the shock end mount including a second elastomeric member, the second elastomeric member disposed outside of a region between the first frame attachment portion and the second frame attachment portion.

9. The suspension component of claim 8, wherein the first elastomeric member and the second elastomeric member are disposed on opposite sides of the wall of the frame bracket.

10. The suspension component of claim 9, wherein the post bracket includes a cap coupled to a distal end of the post, the second elastomeric member disposed between the cap and the wall.

11. The suspension component of claim 10, wherein the post extends through the first elastomeric member, the wall, and the second elastomeric member.

12. The suspension component of claim 1, wherein the shock end mount includes a post bracket coupled to the first end of the shock absorber, the post bracket having a post extending through an opening in a wall of the frame bracket, the post and the opening having a rectangular cross-section to limit rotation between the post bracket and the frame bracket.

13. A suspension component for a bicycle, the suspension component comprising:
   a shock absorber including a spring and a damper configured in a telescoping arrangement, the shock absorber having a first end and a second end opposite the first end;
   a first shock end mount coupled to the first end of the shock absorber, the first shock end mount including a first frame attachment portion to be coupled to a frame of the bicycle, the first shock end mount including a first cushioning member to enable relative movement between the first end of the shock absorber and the first frame attachment portion; and
   a second shock end mount coupled to the second end of the shock absorber, the second shock end mount including a second frame attachment portion to be coupled to the frame for the bicycle, the second shock end mount including a second cushioning member to enable relative movement between the second end of the shock absorber and the second frame attachment portion, wherein the first cushioning member and the second cushioning member are disposed outside of a region between the first frame attachment portion and the second frame attachment portion.

14. The suspension component of claim 13, wherein the first end has a first eyelet, the first shock end mount coupled to the first eyelet.

15. The suspension component of claim 13, wherein the first and second shock end mounts are aligned along a longitudinal axis of the shock absorber.

16. The suspension component of claim 13, wherein the first and second cushioning members are constructed of nitrile rubber.

17. The suspension component of claim 13, wherein,
   the first end mount includes a first frame bracket, the first frame bracket including the first frame attachment portion,
   the first end mount includes means for preventing rotation between the shock absorber and the first frame bracket,
   the second end mount includes a second frame bracket, the second frame bracket including the second frame attachment portion, and
   the second end mount includes means for preventing rotation between the shock absorber and the second frame bracket.

18. A shock end mount to couple a shock absorber to a frame of a bicycle, the shock end mount comprising:
   a frame bracket including a threaded opening to receive a threaded fastener to couple the frame bracket to the frame of the bicycle, the frame bracket having a wall with an opening;
   a post bracket to be coupled to the shock absorber, the post bracket including a base, a post extending from the base, and a cap coupled to a distal end of the cap, the post extending through the wall of the frame bracket, the post and the opening in the wall having a rectangular cross-section to limit rotation between the frame bracket and the post bracket;
   a first elastomeric member disposed between the base and the wall; and
   a second elastomeric member disposed between the cap and the wall, the first and second elastomeric members to enable relative movement between the frame bracket and the shock absorber.

19. The shock end mount of claim 18, wherein the frame bracket defines a cavity, the first elastomeric member disposed in the cavity.

20. The shock end mount of claim 18, further including a bushing in the opening, the post of the post bracket extending through the bushing.

\* \* \* \* \*